(12) United States Patent
Bliss et al.

(10) Patent No.: US 9,442,476 B2
(45) Date of Patent: Sep. 13, 2016

(54) MULTIPLE DEPLOYMENT OF APPLICATIONS WITH MULTIPLE CONFIGURATIONS IN AN INDUSTRIAL AUTOMATION ENVIRONMENT

(71) Applicant: Rockwell Automation Technologies, Inc.

(72) Inventors: Ronald Eric Bliss, Twinsburg, OH (US); Terrie E. Sauvain, Sagamore Hills, OH (US); Kenneth Scott Plache, Scottsdale, AZ (US); Christopher E. Stanek, Willoughby, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 14/569,177

(22) Filed: Dec. 12, 2014

(65) Prior Publication Data

US 2015/0100140 A1 Apr. 9, 2015

Related U.S. Application Data

(63) Continuation of application No. 13/174,528, filed on Jun. 30, 2011, now Pat. No. 8,914,794.

(51) Int. Cl.
*G06F 9/44* (2006.01)
*G06F 9/445* (2006.01)
*G05B 19/04* (2006.01)

(52) U.S. Cl.
CPC .............. *G05B 19/04* (2013.01); *G06F 8/61* (2013.01); *G06F 8/63* (2013.01); *G06F 8/64* (2013.01); *G05B 2219/23438* (2013.01)

(58) Field of Classification Search
CPC .............. G06F 8/71; G06F 8/61; G06F 8/60; G06F 8/63; G06F 8/35; G06F 8/443; G06F 8/41; G06F 8/456; G05B 19/04
See application file for complete search history.

(56) References Cited

U.S. PATENT DOCUMENTS

| | | |
|---|---|---|
| 5,626,194 A | 5/1997 | White |
| 5,836,398 A | 11/1998 | White |

(Continued)

FOREIGN PATENT DOCUMENTS

| | | |
|---|---|---|
| CN | 101529351 | 9/2009 |
| WO | 2008017907 A1 | 2/2008 |

OTHER PUBLICATIONS

Chattopadhyay et al., High-level modelling and exploration of coarse-grained re-configurable architectures, Mar. 2008, 6 pages.*

(Continued)

*Primary Examiner* — Thuy Dao
(74) *Attorney, Agent, or Firm* — Amin, Turocy & Watson, LLP

(57) ABSTRACT

Systems and methods are provided to implement a design apparatus for applications in an industrial automation environment. The design apparatus is configured to maintain multiple configuration settings in connection with an application project. At deployment-time, a particular configuration can be selected and utilized when building an application for installation on a target device. The same application project can be utilized to deploy the application to multiple systems through selection of different configurations.

12 Claims, 27 Drawing Sheets

(56) References Cited

U.S. PATENT DOCUMENTS

| | | | |
|---|---|---|---|
| 5,848,485 A | 12/1998 | Anderson et al. | |
| 5,971,581 A | 10/1999 | Gretta et al. | |
| 6,532,409 B1 | 3/2003 | Fujishima et al. | |
| 7,210,143 B2 | 4/2007 | Or et al. | |
| 7,318,227 B1 | 1/2008 | Hohne et al. | |
| 7,367,028 B2 | 4/2008 | Kodosky et al. | |
| 8,006,223 B2 | 8/2011 | Boulineau et al. | |
| 8,037,472 B2 * | 10/2011 | Lupini | G06F 8/61 717/175 |
| 8,099,588 B2 * | 1/2012 | Massimiliano | G06F 8/61 713/1 |
| 8,099,728 B2 * | 1/2012 | Marinelli | G06F 8/61 709/221 |
| 8,185,871 B2 | 5/2012 | Nixon et al. | |
| 8,365,164 B1 * | 1/2013 | Morgenstern | G06F 8/61 717/108 |
| 8,584,116 B2 | 11/2013 | Shima | |
| 8,677,317 B2 * | 3/2014 | Arnold | G06F 8/61 717/105 |
| 2002/0138659 A1 * | 9/2002 | Trabaris | G06F 9/546 719/313 |
| 2004/0123091 A1 | 6/2004 | Das | |
| 2007/0204323 A1 * | 8/2007 | Wilkinson et al. | 726/1 |
| 2008/0208375 A1 * | 8/2008 | Grgic et al. | 700/86 |
| 2009/0150881 A1 | 6/2009 | Lupini et al. | |
| 2009/0158272 A1 | 6/2009 | El-Assir et al. | |
| 2009/0240348 A1 | 9/2009 | Chand et al. | |
| 2010/0042376 A1 * | 2/2010 | Weatherhead | 703/1 |
| 2013/0067456 A1 * | 3/2013 | Khilnani | G06Q 10/067 717/174 |
| 2015/0199197 A1 * | 7/2015 | Maes | G06F 8/71 717/122 |

OTHER PUBLICATIONS

Leitner et al., Managing ERP configuration variants: an experience report, Oct. 2010, 6 pages.*
European Office action dated Apr. 25, 2014 for European Patent Application No. 12174536.8-1954, 3 pages.
Chinese Office Action for Application No. 201210227136.7 dated Aug. 8, 2014, 18 pages.
Extended European Search Report for Application No. 12174536.8-1954 / 2541396 dated Sep. 10, 2014, 7 pages.
Non-Final Office Action dated Dec. 23, 2013 for U.S. Appl. No. 13/174,528, 17 pages.
Advisory Action dated Aug. 20, 2014 for U.S. Appl. No. 13/174,528, 4 pages.
Final Office Action dated Jun. 10, 2014 for U.S. Appl. No. 13/174,528, 15 pages.
Notice of Allowance dated Sep. 24, 2014 for U.S. Appl. No. 13/174,528, 36 pages.
Chinese Office Action for Chinese Patent Application No. 201210227136.7 dated Apr. 24, 2015, 6 pages.
Allen-Bradley, DeviceNet Network Configuration, Mar. 2011, 192 pages.
Chinese Office Action and English translation for Application No. 201210227136.7 dated Oct. 27, 2015, 9 pages.

* cited by examiner

FIG. 17

MULTIPLE DEPLOYMENT OF APPLICATIONS WITH MULTIPLE CONFIGURATIONS IN AN INDUSTRIAL AUTOMATION ENVIRONMENT

CROSS REFERENCE TO RELATED APPLICATIONS

This application is a continuation of U.S. patent application Ser. No. 13/174,528 filed Jun. 30, 2011 and entitled MULTIPLE DEPLOYMENT OF APPLICATIONS WITH MULTIPLE CONFIGURATIONS IN AN INDUSTRIAL AUTOMATION ENVIRONMENT, the entirety of which is incorporated herein by reference.

TECHNICAL FIELD

The subject disclosure relates to a design apparatus that can maintain discrete sets of application configuration settings in association with an application project and deploy an application, based on the application project, to multiple targets, in an industrial automation environment, in accordance with multiple configurations.

BACKGROUND

In an automation environment such as a factory, a processing plant, a material handling facility, or any other suitable venue at which automation is present, a wide array of equipment is utilized. This wide array of equipment can include, for example, various manufacturing machines such as batch processing machines, material handling machines, fabrication machines, welding machines, packaging machines, finishing machines, transportation machines, and the like. The equipment in an automation environment can be monitored and controlled via a plurality of controllers coupled to a plurality of sensors, I/O modules, drives, etc.

Also, associated with the industrial machines and/or controllers are human-machine interface (HMI) devices. HMI devices can include physical-type interfaces including a plurality of physical buttons, switches, knobs displays, indicators, and so on. Increasingly, however, conventional HMIs are being replaced with graphical user interfaces (GUIs) displayed, for example, on display screens. In some cases, the displays screens can be touch screens which can handle user input while displaying output. For instance, machines can include terminals (e.g., touch screens) embedded therein that can execute applications configured to generate the HMI GUI, receive user input, process user input, etc. In another example, terminals can be standalone devices, e.g., general purpose computing devices such as a personal computer, located remote or separate from the machines. However, such standalone machines can execute similar applications and/or provide similar control of machine functions as the embedded counterparts. Further, terminals can be of a portable nature such as a mobile operator interface device, e.g., a tablet computer, which can be carried to, and connected with, a plurality machines as desired. It is to be appreciated that while the term terminal is utilized hereafter, the term terminal encompasses all instances of devices and configurations as described, and accordingly includes personal computing device, HMI, machine located terminal, machine located HMI, test system, stand alone terminal, stand alone HMI, and the like.

To provide rich HMI applications, the terminals can communicate with controllers managing machines associated with the applications. Via communications with the controllers, HMI applications can retrieve controller variables (e.g., machine conditions, machine inputs, machine outputs, etc.) for display on the GUI and can forward commands received via the GUI to the controllers. The commands can operate to change controller variables, execute processes, make changes to running processes, override automated actions with operator-supplied actions, etc.

To enable such communications, the application, at design time, can be configured with connection information, which is utilized to locate and connect with controllers once the application is deployed on a terminal. The configuration information (e.g., such as the connection information but can also include security information) is typically fixedly associated with the application and, in particular, an application project employed to build and deploy the application to a terminal. Due to this tight coupling, an HMI application, when created, becomes coupled to a particular machine.

For instance, a machine builder (e.g., an original equipment manufacturer (OEM)) can create an HMI application with one configuration and deliver the machine (with application) to a customer where the configured is modified in accordance with the customer's systems. Several iterations of this procedure can occur when, for example, a problem occurs and the machine or application needs servicing or updating. The application, when returned to the manufacturer, is reconfigured to original settings for continued development and testing. When an updated application is returned to the customer, the application is yet again reconfigured. Such frequent reconfigurations can lead to errors or mistakes.

In another example, an identical application can be deployed to similar machines placed with a factory (e.g., redundant process lines). Conventionally, the application is duplicated and respective duplicates are configured for a particular machine. Handling multiple project duplicates and configurations can lead to mishandling and other configuration errors. Similarly, users who desire to maintain test systems, pilot production systems and/or primary production systems also maintain duplicate application projects and configurations. Such deployment can be by a variety of means. In one aspect an application can be downloaded directly to any one of a machine, HMI, controller, etc. In another aspect an electronic file can be created which contains the configuration application and configuration settings for target equipment (e.g., a plurality of machines) with a user moving from one machine, HMI, controller, etc., to another and downloading/installing the application individually by such means as a FTP file transfer or via a removable memory card such as a USB memory stick, SD memory card, and the like.

Typically, mechanisms to manage multiple configurations for HMI application, controller applications, and/or other software applications within an industrial automation environment involve manual processes to create multiple copies, and to change settings for the copy when the application deployed according to a different configuration. Another approach is to employ an automated tool which enables a configuration to be exported, altered, and re-imported. In yet another conventional approach, an application program interface (API) can be leveraged to change configurations back and forth. In the aforementioned techniques, however, end user customers are burdened with a time consuming and error prone task for managing an application project.

Further, in another approach, a designer may require a first version of an application is loaded onto a test/pilot system while a second version of an application is loaded onto one or more machines comprising a production system which is being modeled/mimicked by the test/pilot system.

In a further approach, a manufacturer/supplier (e.g., OEM) of a machine may supply the same machine version to a plurality of end users/manufacturers. The OEM may desire to maintain a single project comprising configuration settings for each of their customers. Hence, a requirement can evolve where a plurality of applications have to be developed and managed in accord with their individual customers requirements. Accordingly, a single application may have a plurality of revision levels such as customer A receives revision 1 of a GUI visualization, while customer B receives revision 2 of the GUI visualization. Hence, each time an application is deployed appropriate content, e.g., specific to a particular customer, is deployed.

The above-described deficiencies of conventional HMI application settings management solutions are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various, non-limiting embodiments, a design apparatus configured to facilitate development of applications in an industrial automation environment is described. The design apparatus is configured to maintain multiple configuration settings in connection with an application project. At deployment-time, a particular configuration can be selected and utilized when building an application for installation on a target device. The same application project can be utilized to deploy the application to multiple, disparate systems through selection of different configurations.

These and other embodiments are described in more detail below.

BRIEF DESCRIPTION OF THE DRAWINGS

Various non-limiting embodiments are further described with reference to the accompanying drawings in which:

FIGS. 16-23 are exemplary, non-limiting illustrations of user interfaces of an design apparatus in accordance with one or more aspects;

DETAILED DESCRIPTION

General Overview

Figure 1:
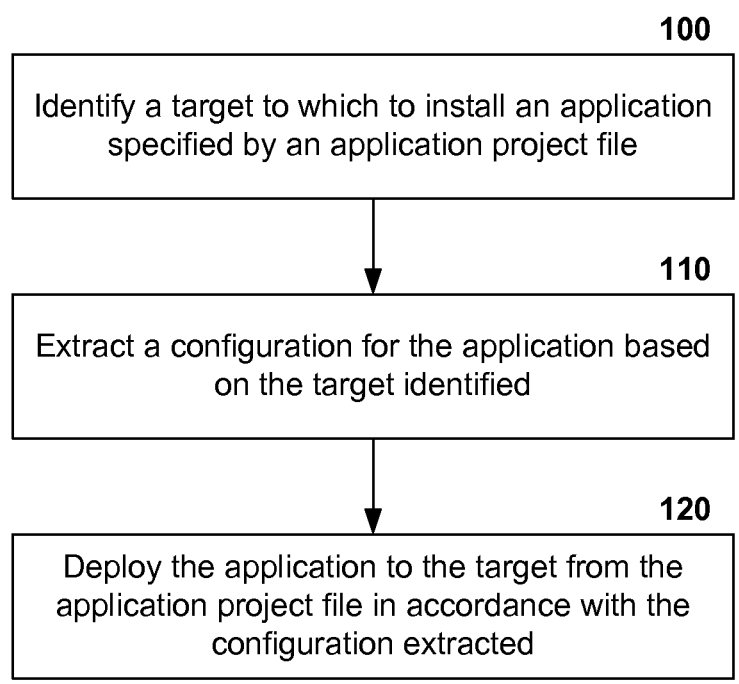
FIG. 1 is a flow diagram illustrating an exemplary, non-limiting embodiment for deploying an application, from an application project, to a target based on a configuration corresponding to the target.

As discussed in the background, conventional application development environments for industrial automation products typically maintain system settings and other configurations within an application project such that the application project is associated with a single group of settings. Accordingly, to deploy an application project to multiple similar machines and/or to different environments (e.g., production environment, testing environment, OEM environment, end user customer environment, etc.) manual alteration of settings occurs prior to deployment. Manual processes and/or frequent changes to settings can lead to errors, which can have many repercussions. For instance, an error in an IP address of a controller can result in an HMI application on a terminal pulling data from a different controller than which was intended. This can lead to undesirable operating conditions going unnoticed, faulty machine output which is difficult to diagnose, conflicting user input at a controller from multiple terminals, command inputs being sent to a wrong machine, and so on.

In various, non-limiting embodiments, a design apparatus for applications (e.g., HMI application, controller applications, terminal applications, etc.) in an industrial automation environment is provided that enables development of applications and configuration information. With the design apparatus, control applications (e.g., for controllers) and/or visualization applications (e.g., HMI applications, for terminals) can be developed. A design of an application is retained in an application project managed by the design apparatus.

As described above, typically, configurations for a specific deployment target (e.g., a specific controller or specific terminal) are maintained with the application project. Thus, there is one set of configurations for a given application project. To deploy the application project to a target different than an original target, the configurations are changed. The design apparatus, described herein, maintains configurations separate from the application projects. Accordingly, by maintaining multiple sets of configurations, the design apparatus enables deployment of an application, from a single application project, to multiple targets respectively associated with distinct configurations.

In one embodiment, an apparatus is described herein that includes a computer-readable storage medium configured to retain an application project, associated with an application, and a plurality of sets of configuration information corresponding to the application project, and a processor, coupled to the computer-readable storage medium, configured to execute computer-executable modules stored on the computer-readable storage medium. In an example, the computer-executable modules can include a designer module configured to expose and to activate a plurality of development tools employable to generate content, contained within the application project, that specifies the application, and a deployment module configured to install the application to a target based on the application project and a set of configuration information, of the plurality of sets of configuration information, respectively associated with the target. In another example, the computer-readable medium includes a plurality of data stores, wherein the plurality of data stores can include a development library store configured to retain a plurality of development libraries available for incorporation into the application project and for utilization by the application, an application project store configured to retain a plurality of application projects, an application configuration store configured to store the plurality of sets of configuration information, and a target information store configured to retain information related to devices to which the application is deployable.

According to further embodiments, the computer-executable modules stored on the computer-readable storage medium can include a configuration module configured to generate the plurality of sets of configuration information, to store the plurality of sets of configuration information to the computer-readable storage medium, and to modify one or more sets of the plurality of sets of configuration information. According to an example, the configuration module can include an autonomous configuration module configured to evaluate target information related to the target and autonomously generate the set of configuration information associated with the target. In addition, the autonomous configuration module can include a target analysis module configured to identify characteristics of the target based on the target information, a network analysis module configured to determine network settings of the target based on network information included in the target information, a security analysis module configured to identify security policies associated with the target, an application analysis module configured to identify characteristics of the application based on the application project, and a configuration generation module configured to generate the set of configuration information associated with the target based on information provided by at least one of the target analysis module, the network analysis module, the security analysis module, or the application analysis module. Further still, the computer-executable modules stored on the computer-readable storage medium can include an environment evaluation module configured to obtain environmental information regarding an system environment in which the target is located, to query the target to obtain device information, and to compile the environmental information and the device information into the target information.

In accordance with additional examples, the deployment module can include a target identification module configured to determine the target which selected for application deployment and to extract the set of configuration information from the plurality of sets of configuration information based on the determination of the target selected. In addition, the deployment module can include a build module configured to compile the application project to generate the application and to configure the application compiled in accordance with the set of configuration information. Further, the deployment module can include a download module configured to download the application to the target.

In yet another example, the application can be at least one of a control application deployable to a controller or a visualization application deployable to a terminal, wherein the controller and the terminal are included in an industrial automation environment. The terminal, according to another example, can be embedded in an industrial apparatus in the industrial automation environment.

According to further embodiments, a method is described herein that includes identifying a first entity to which to install an application specified by an application project file, extracting first configuration information of a plurality of configuration information, wherein the first configuration information corresponds to the first entity, and deploying the application to the first entity based on the application project file and the first configuration information, wherein the first entity is at least one of a controller or a human-machine interface (HMI) terminal within an industrial automation environment. In an example, the method can also include identifying a second entity to which to install the application specified by the application project file, extracting second configuration information from the plurality of configuration information, wherein the second configuration information corresponds to the second entity, and installing the application to the second entity based on the application project file and the second configuration information, wherein the first configuration information is distinct from the second configuration information and the application installed on the first entity and the second entity derives from an identical application project file.

In another example, installing the application to the second entity further comprises deploying the application to a development system containing the second entity, and the deploying the application to the first entity further comprises deploying the application to a production system containing the first entity. According to a different example, installing the application to the second entity further comprises deploying the application to an original equipment manufacturer system containing the second entity, and the deploying the application to the first entity further comprises deploying the application to a customer system containing the first entity.

According to further examples, the method can include receiving configuration input related to the first entity of the industrial automation environment, generating the first configuration information based on the configuration input, and including the first configuration information in the plurality of configuration information. In another embodiment, the method includes receiving target information associated with the first entity, evaluating the target information to identify characteristics of the first entity, generating the first configuration information based on the characteristics of the first entity, and including the first configuration information in the plurality of configuration information. Moreover, the method can include deploying the application to a third entity based on the application project file and the first configuration information.

In an additional embodiment, a system is described herein that includes a controller, communicatively coupled to an industrial apparatus, and configured to, at least one of, monitor operation of the industrial apparatus or direct the operation of the industrial apparatus, a terminal, communicatively coupled to the controller, and configured to execute a visualization application which is configured to visually display a state of the industrial machine, wherein the state is received from the controller; and a design apparatus. In an example, the design apparatus can include a processor, coupled to a computer-readable storage medium, configured to execute computer-executable modules retained on the computer-readable storage medium. The computer-executable modules can include a configuration module configured to manage a plurality of configuration information, wherein respective configuration information, from the plurality of configuration information, is respectively associated with respective controllers from a set of controllers which includes the controller and respective terminals from a set of terminals which includes the terminal, and a deployment module configured to install the visualization application to the terminal based on first configuration information, of the plurality of configuration information, wherein the first configuration information specifies parameters to enable the terminal to communicate with the controller. In yet another example, the system can include a second controller, communicatively coupled to a second industrial apparatus, and configured to, at least one of, monitor operation of the second industrial apparatus or direct the operation of the second industrial apparatus, and a second terminal, communicatively coupled to the second controller, and configured to execute the visualization application which is configured to visually display a state of the second industrial apparatus, wherein the state is received from the second controller, wherein the deployment module is further configured to install the visualization application to the second terminal based on second configuration information, of the plurality of configuration information, respectively associated with the second terminal, to enable the second terminal to communicate with the second controller when executing the visualization application.

Herein, an overview of some of the embodiments for a design apparatus and associated methods has been presented above. As a roadmap for what follows next, an overview of exemplary, non-limiting embodiments and features of a design apparatus and associated mechanisms are described in more detail. Then, some non-limiting deployment scenarios in which the design apparatus can be employed are described, followed by some non-limiting, exemplary user interfaces. Finally, some non-limiting implementations and examples are given for additional illustration, followed by representative network and computing environments in which such embodiments and/or features can be implemented.

Multi-Deployment of Applications with Multiple Configurations

As mentioned above, in various embodiments, a design apparatus in an industrial automation environment enables applications, such as controller applications or visualization applications, to be deployed from an individual application project to multiple targets which correspond to or entail disparate configuration settings. The design apparatus, however, is not limited to deployment of applications according to multiple, disparate configurations. For instance, the design apparatus can be employed to develop the multiple, disparate configurations, design the application, build the application, etc. Moreover, as described herein, the design apparatus can leverage inferential techniques to derive appropriate configurations, thus relieving a designer from a manual configuration process.

With respect to one or more non-limiting aspects of the design apparatus as described above, FIG. 1 shows a flow diagram illustrating an exemplary, non-limiting embodiment for deploying an application, from an application project, to a target based on a configuration corresponding to the target. The embodiment depicted in FIG. 1 can be employed by a design apparatus as described below in accordance with one or more embodiments. As shown in FIG. 1, at 100, a target, to which to install an application specified in an application project file, is identified. As described herein, the target can be a controller (e.g., as a target for a control application) or a visualization device, such as an embedded terminal or other computing device (e.g., as a target for a visualization application). At 110, a configuration for the application is extracted based on the target identified. For example, the configuration can be one configuration in a set of configurations, with respective configurations, of the set of configuration, respectively associated with disparate target devices. At 120, the application is deployed to the target, based on the application project file, and in accordance with the configuration extracted.

Figure 2:
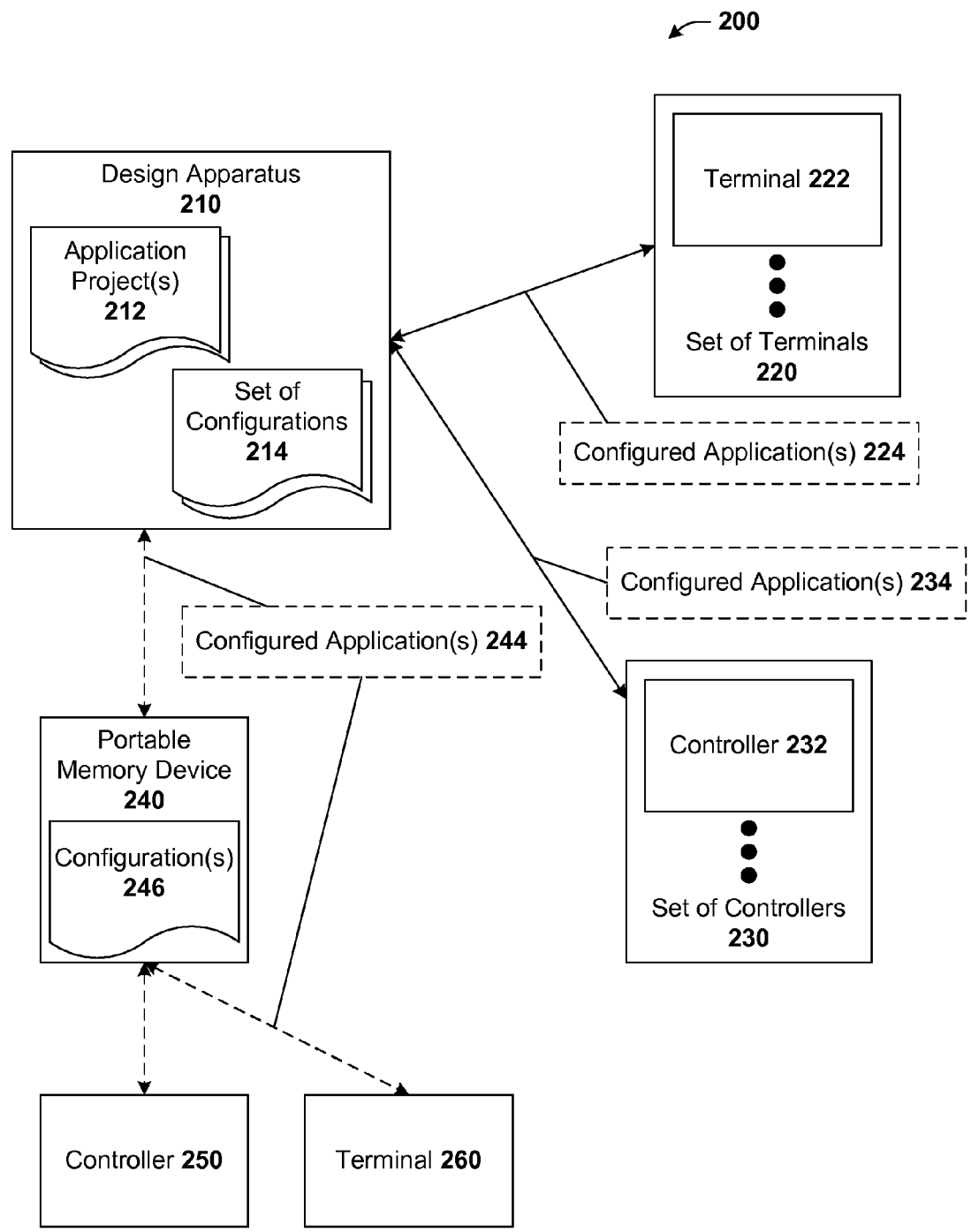
FIG. 2 is a block diagram illustrating an exemplary, non-limiting industrial automation environment configured to utilize one or more aspects of the subject disclosure.

FIG. 2 depicts a block diagram illustrating an exemplary, non-limiting industrial automation environment configured to utilize one or more aspects of the subject disclosure. In particular, FIG. 2 illustrates an industrial automation environment 200 configured to utilize the embodiment described above with respect to FIG. 1. Industrial automation environment 200 can include a design apparatus 210, which can, in one example, be a computing device configured with application design software. Also included in industrial automation environment 200, as shown in FIG. 2, are a set of terminals 220 and a set of controllers 230. According to an example, the set of terminals 220 can include one or more terminals, such as terminal 222 shown in FIG. 2. Similarly, the set of controllers 230 can include one or more controllers such as controller 232. Terminal 222 can be, in an example, a display screen or touch screen embedded on an industrial apparatus. In another example, terminal 222 can be standalone computing device (e.g., mobile device, smart phone, PDA, laptop computer, desktop computer, tablet PC, etc.) located remotely from the industrial apparatus but coupled therewith via a network, or other communications medium. Controller 232 can be substantially any suitable industrial controller commonly employed in industrial automation, including, but not limited to, a programmable logic controller, a motion controller, a supervisory control and data acquisition system, a distributed control system, a process automation controller, and the like.

According to an aspect, design apparatus 210 can manage a plurality of application projects 212, with respective application projects corresponding to applications for controllers (e.g., controller 232) from the set of controllers 230 and/or for terminals (e.g., terminal 222) from the set of terminals 220. In addition, design apparatus 210 can retain a set of configurations 214 respectively corresponding to one or more application projects 212. Design apparatus 210, in an example, is configured to deploy applications based upon an application project from the plurality of application projects 212. During deployment, design apparatus 210 can build the application (e.g., compile, link, etc.) from the project and download the built application to a target (e.g., terminal 222, controller 232, or any other terminal and/or controller). During building of the application, design apparatus 210 can configure the application in accordance with one or more configurations from the set of configurations 214. The configurations can include a variety of parameters and/or settings corresponding to aspects of the target. As such, the built applications can be specialized for a particular target despite being built from a generic or general application project common to a plurality of devices. For instance, as shown in FIG. 2, design apparatus 210 can generate configured applications 224, which are download to one or more terminals of the set of terminals 220. In addition, design apparatus can 210 build and configure configured applications 234 from one or more of application projects 212 and download configured applications 234 to one or more controllers of the set of controllers 232.

To further illustrate an aspect of design apparatus 210, the set of terminals 220, in an example, can include a first terminal and a second terminal. The first and second terminals can be coupled to first and second industrial machines, respectively, which perform similar tasks. Accordingly, the first and second terminals can execute similar visualization applications. However, the first and second terminals, being associated with disparate but identical industrial machines, can communicate with disparate information sources (e.g., machine components, controllers, enterprise servers, etc.), can include different sets of authorized operators (e.g., different security policies), and the like. Moreover, the first and second terminals can comprise different hardware components (e.g., different resolution displays, different brightness settings, etc.). As such, while a majority of a visualization application, as specified in an application project, is reused, without alteration, between the first terminal and the second terminal, other portions are specific to the first terminal and/or the second terminal. To eliminate maintaining separate application projects for the first terminal and the second terminal, design apparatus 210 can maintain a single application project file for the application deployed to the first terminal and the second terminal and separate configuration settings respectively associated with the first and second terminals. Thus, to deploy the application to both the first terminal and the second terminal, design apparatus 210 can build the application twice, from the same application project, once with configuration settings associated with the first terminal and again with settings corresponding with the second terminal.

In a further, exemplary, non-limiting embodiment, as depicted in FIG. 2, one or more configured applications 244 can be generated by design apparatus 210 and stored on a portable memory device 240. Hence, rather than a device (e.g., terminal 222, controller 232, etc.) being communicatively coupled to the design apparatus 210, a device (e.g., controller 250, terminal 260) can be operating remotely and one or more configured applications 244 can be uploaded locally at the device. In a further, exemplary, non-limiting embodiment, any configuration data, e.g., configuration(s) 246, pertaining to the remote device (e.g., controller 250, terminal 260) can also be stored on the portable memory device 240. Upon reconnection of the portable memory device 240 with design apparatus 210, configuration(s) 246 can be downloaded from the portable memory device 240 to update/modify the existing set of configurations 214.

Figure 3:
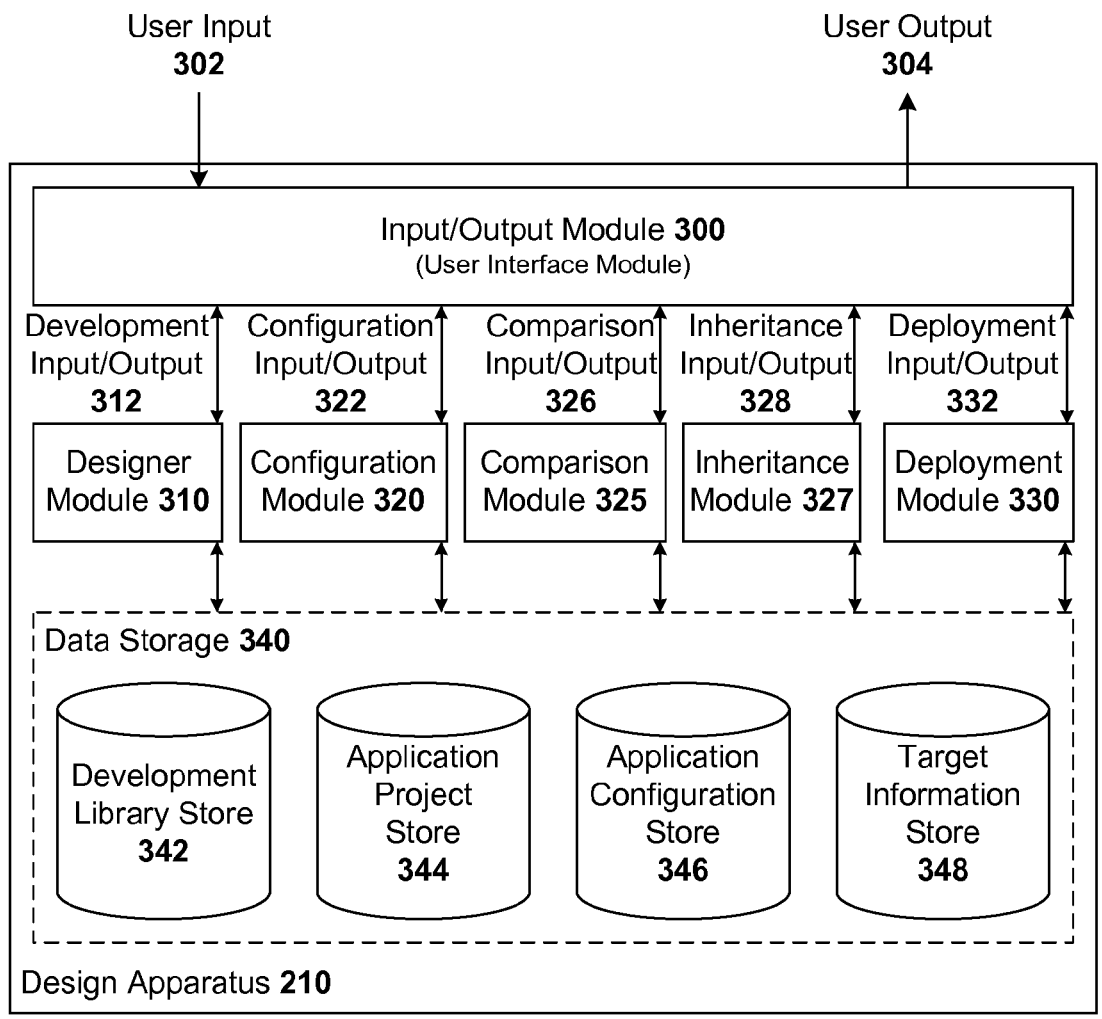
FIG. 3 is a block diagram illustrating an exemplary, non-limiting design apparatus, implemented on a computing system, configured to facilitate deployment of an application to multiple targets with respective configurations.

FIG. 3 depicts a block diagram illustrating an exemplary, non-limiting design apparatus 210, implemented on a computing system, configured to facilitate deployment of an application to multiple targets with respective configurations as described above with respect to FIGS. 1 and 2. Design apparatus 210, as shown in FIG. 3, can include an input/output module 300 (also referred to as a user interface module). Input/output module 300 can receive user input 302 from a user via, for example, a variety of input devices such as mice, keyboards, touch screens, tablets, microphones, video cameras, etc. In addition, input/output module 300 can generate user output 304 and provide user output 304 to an output device, such as a display screen.

In a non-limiting embodiment, the user input 302 can provide direction(s) regarding which devices (e.g., terminal 222, controller 232, etc.) are to receive a configured application(s) (e.g., configured application(s) 224 and 234). Generation of the configured application(s) is performed in accordance with the configuration(s) of a device identified in the user input 302.

As further shown in FIG. 3, input/output module 300 is configured to process user input 302 and delegate (e.g., forward) user input 302 to respective subsystems depending on a type of input represented or a mode, e.g., state, of design apparatus 210. For instance, design apparatus 210 can exist in a development mode where, for example, an application is designed and developed. Accordingly, input/output module 300 can forward user input 302 to a designer module 310 and obtain user output 304 as development input/output 312. In another example, user input 302 can relate to configuration settings and/or design apparatus 210 can be in a configuration management mode. According to this example, input/output module 300 can forward input to and accept output from a configuration module 320 (e.g., shown in FIG. 3 as configuration input/output 322). In yet another example, a deployment module 330 is included in design apparatus 210 to exchange deployment input/output 332 with input/output module 300 when user input 302 relates to deployment and/or design apparatus 210 exists in a deployment state or mode.

As further shown in FIG. 3, design apparatus 210 can include data storage 340 which can comprises one or more storage units such as a development library store 342, an application project store 344, application configuration store 346, and a target information store 348. While shown as distinct storage units, it is to be appreciated that the individual stores 342-348 can be separate partitions of a larger data store (e.g., a database system).

In accordance with an embodiment, designer module 310 can coordinate development activities of design apparatus 210 and, as such, can interact with development library store 342 and/or application project store 344. As described in greater detail below, designer module 310 can provide a plurality of development tools which facilitate creation of controller logic for control applications and creation of visualization screens for HMI applications. Controller logic and/or visualization screens designed via designer module 310 can link to resources supplied by one or more libraries stored by development library store 342. The designed logic and/or screens, as well as links to libraries, can maintained as an application project stored by application project store 344.

Configuration module 320, according to an example, facilitates generating application settings, changing application settings, and storing application settings in, for example, application configuration store 346. For instance, configuration module 320, via configuration input/output 322, can provide wizards, and/or interface tools, which can be utilized to manage configurations, which can be employed at deployment-time to generate configured application specific to selected targets. In another example, configuration module 320 can utilize target information store in target information store 348 to autonomously generate configuration for a particular target and/or generate target information based on evaluation of a target. Deployment module 330 facilitates deployment of applications as specified in application projects created via designer module 310. Deployment module 330, as described further below, can build applications, incorporate settings from one or more configurations from application configuration store 346, and download built and configured applications to a target.

FIG. 3 further shows a comparison module 325 which can be utilized to facilitate comparison of differences between two or more configurations thereby enabling an operator to readily determine how a first configuration differs from a second configuration. Comparison module 325 can interact directly with the data storage 340, enabling an operator to select respective configurations (e.g., from application configuration store 346) to identify the respective differences. Alternatively, comparison module 325 can operate in conjunction with any of the other modules (e.g., designer module 310, configuration module 320, or deployment module 330) as each of the module(s) is utilized as part of the application/configuration deployment process. For example, as changes are being made to a configuration, e.g., with configuration module 320, respective change(s) between the initial configuration and intermediate/final stages of configuration generation can be presented to an operator. Input/Output can be provided to a user in conjunction with input/output module 300 and comparison input/output 326, thereby enabling a user to visualize the differences between respective configurations.

Further shown in FIG. 3 is an inheritance module 327 which can be utilized to control the number of parameters/settings/data stored for a plurality of configurations. For example, if configurations are generated for 10 controllers (e.g., in set of controllers 230), wherein each configuration includes 10 property settings, a total of 100 property settings have to be stored (e.g., in data storage 340, application configuration store 346, etc.) in accord with the 10 controller configurations. However, there may be a number of property settings that are common to each configuration, and only a subset of the total available property settings (e.g., only 2 of the 10 available) are configured unique to each controller configuration. In such a scenario, only the unique property settings have to be stored with the remaining property settings having a common value. Hence, in the example of 10 controller configuration, with 10 property settings, of which 2 are unique to each configuration, the only a total of 28 property settings have to be stored (8 common+20 unique). Inheritance module 327 can be configured to control how/and how many of the property settings are to be stored. To facilitate visualization of the property settings inheritance output/input 328 can be utilized to present the property settings (e.g., unique or common) to an operator via the input/output module 300.

Figure 4:
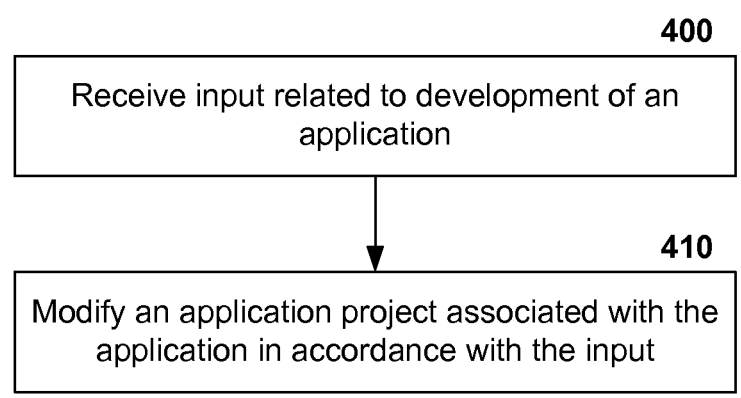
FIG. 4 illustrates a flow diagram of an exemplary, non-limiting embodiment for developing an application.

FIG. 4 illustrates a flow diagram of an exemplary, non-limiting embodiment for developing an application. At 400, input related to development of an application can be received. According to an example, input related to development can include substantially any information received via a user interface associated with development aspects of a design apparatus (e.g., design apparatus 210), such as, but not limited to, controller logic, screen designs, designations of visual elements to incorporate on a screen, connections between disparate portions of controller logics, connections between disparate visual elements of a screen, connections between screens, specification of a library to be linked to the application, definitions of global variables, etc. At 410, an application project, associated with the application, can be modified in accordance with the input.

Figure 5:
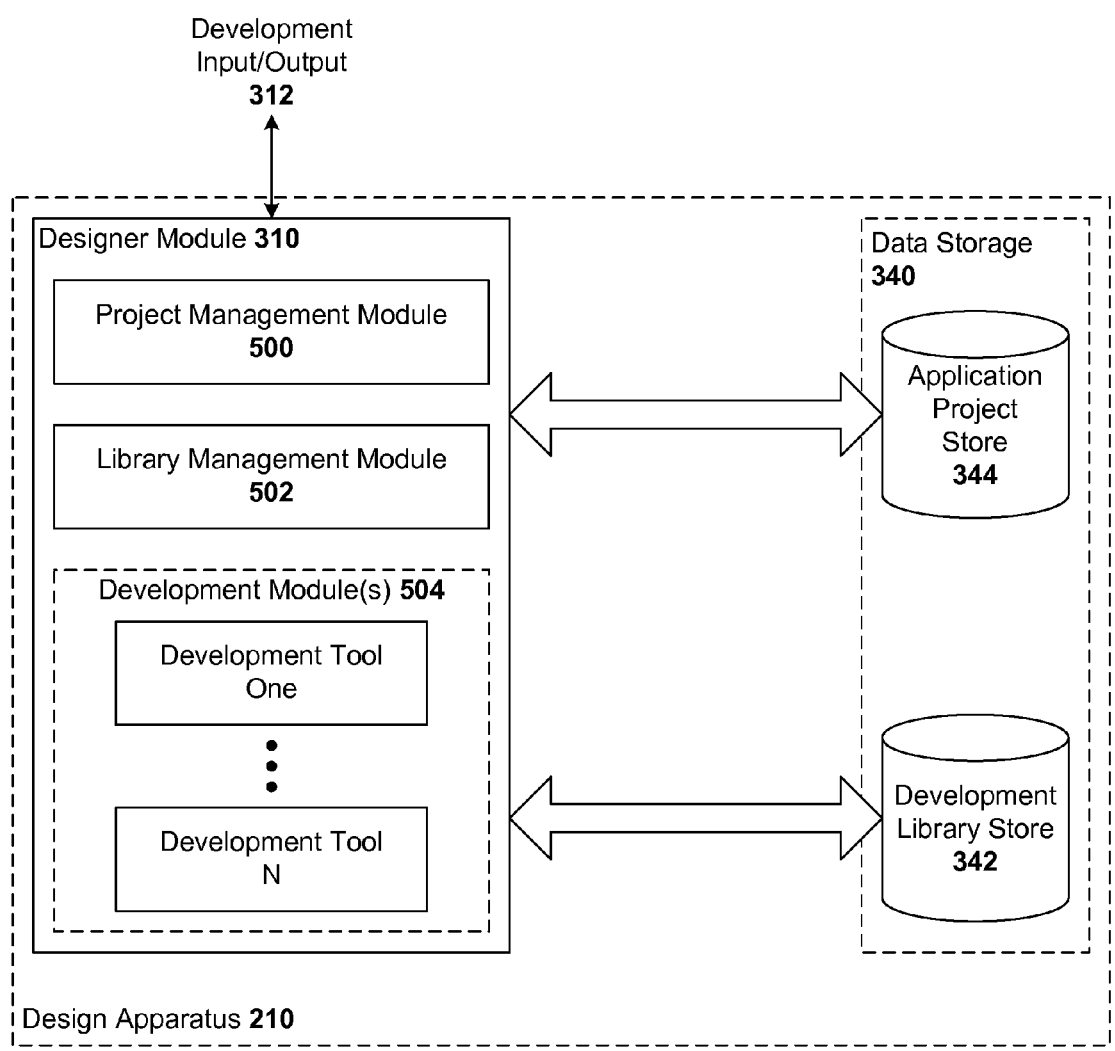
FIG. 5 illustrates a block diagram of an exemplary, non-limiting act of modifying (developing) an application project in accordance with user input.

FIG. 5 illustrates a block diagram of an exemplary, non-limiting act of modifying (developing) an application project in accordance with user input. FIG. 5 can include design apparatus 210 configured to, in an example, implement the embodiment described above with respect to FIG. 4. As shown in FIG. 5, designer module 310 of design apparatus 210 can exchange development input/output 312 with, for instance, input/output module 300 described above in connection with FIG. 3. Development input/output 312, in one aspect, can include the input related to development as described above.

Designer module 310 can include, as illustrated in FIG. 5, a project management module 500 configured to retrieve and store application projects from and to application project store 344. In addition, project management module 500 is further configured to modify or update application projects retained by application project store 344. Similarly, a library management module 502 is provided, which is configured to retrieve, save, or modify libraries from, to, or stored by development library store 342. A development library, as described herein, can include a linkable (e.g., dynamically or statically) module that includes generic functionality and resources which are reusable and/or of benefit to a wide variety of applications. For instance, libraries can be bundles or packages of logic, visualization objects, graphics, etc., which can be leveraged by any application developed on design apparatus 210; thus, eliminating redevelopment or repetitive importation of such resources with respective application projects.

Designer module 310, as shown in FIG. 5, further includes a set of development tools 504, which can include a plurality of development tools, shown in FIG. 5 as development tool one to development tool N, where N is an integer greater than or equal to one. Respective development tools can perform an operation on an application project, such as to capture programming code being written, place visualization objects on a screen, link visualization objects, links code portions, etc. Respective development tools from the set of development tools 504 can be activated (e.g., selected and executed) via development input/output 312 obtained from a user (e.g., an application developer).

Figure 6:
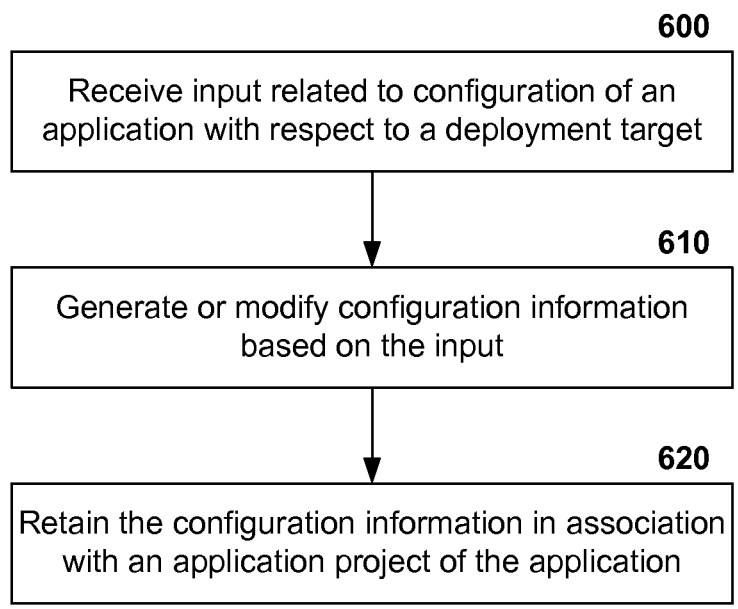
FIG. 6 is a flow diagram illustrating an exemplary, non-limiting embodiment for creating a configuration associated with a deployment target.

FIG. 6 depicts a flow diagram illustrating an exemplary, non-limiting embodiment for creating a configuration associated with a deployment target. At 600, input related to configuration of an application is received. The input related to configuration can be made in regard to a deployment target. Such input can provide include values for particular configuration settings or an entire configuration for a plurality of settings. At 610, configuration information is modified or generated based on the input. At 620, the configuration information is retained in associated with an application project of the application.

According to an example, configuration information, for an application, can include a plurality of settings or parameters and be associated with a particular deployment target (e.g., a controller, terminal, etc.). For a visualization or HMI application, to be deployed to a terminal, the plurality of settings can include connection settings (e.g., network configurations for the terminal, network locations of referenced devices (controllers), gateway information to enterprise systems, etc.), database settings (e.g., database names, database credentials, etc), security settings (e.g., access lists, permissions, security policies, etc), screen settings (e.g., connections between screens, ordering of screens, content of screens, graphics object includes on a screen, etc.), library linkages (e.g., specification of which libraries to link to a deployed application), hardware settings (e.g., brightness, resolution, etc.), and so on. For a control application, to be deployed to a controller, the plurality of settings can include, without limitation, library linkages, network locations of sensors, drives, indicators, and/or other I/O devices, network settings for the controller, program settings, machine input/output, locations of device on a backplane, and the like.

Figure 7:
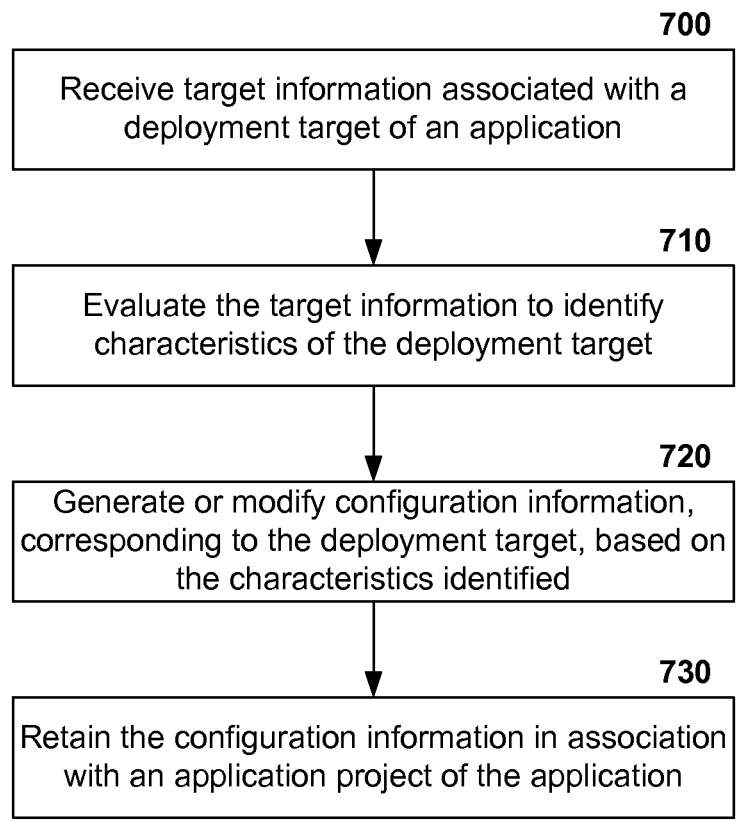
FIG. 7 is a flow diagram illustrating an exemplary, non-limiting embodiment for generating a configuration based on an analysis of a deployment target.

FIG. 7 depicts a flow diagram illustrating an exemplary, non-limiting embodiment for generating a configuration based on an analysis of a deployment target. At 700, target information, associated with a deployment target of an application, is received. At 710, the target information is evaluated to identify characteristics of the deployment target. For instance, target information can include a hardware specification, including capabilities, of the deployment target, a network location of the deployment target, network or communication capabilities of the deployment target, a security policy associated with the deployment target, or the like. Based on the characteristics identified, at 720, configuration information, corresponding to the deployment target, can be generated and/or modified. At 730, the configuration information, which is generated or modified at 720, is retained in associated with an application project of the application.

Figure 8:
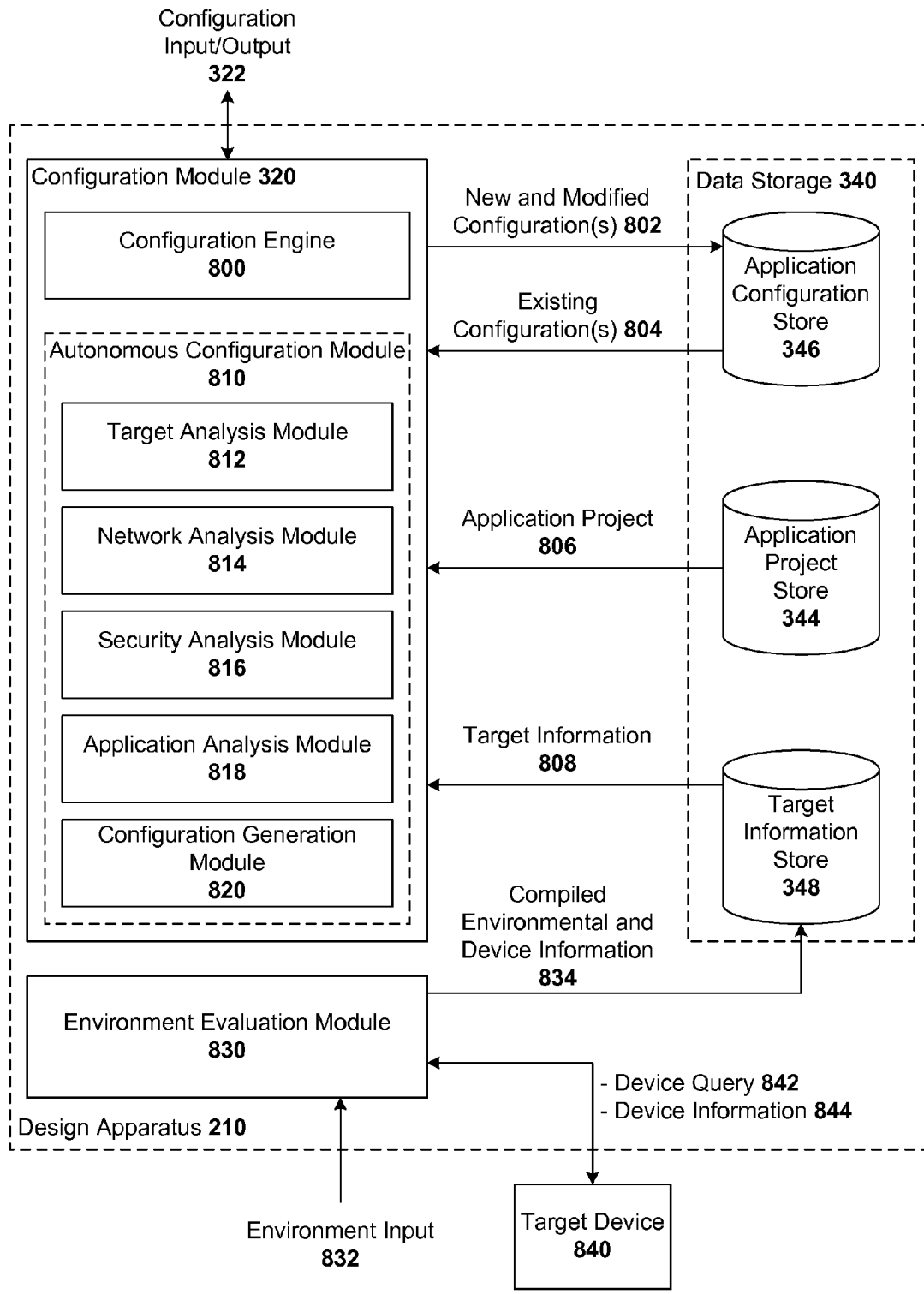
FIG. 8 is a block diagram illustrating an exemplary, non-limiting design apparatus configured to manage and generate configurations utilized to deploy an application project to a target.

FIG. 8 depicts a block diagram illustrating an exemplary, non-limiting design apparatus configured to manage and generate configurations utilized to deploy an application project to a target. FIG. 8 illustrates design apparatus 210 configured to, in an example, implement the embodiments described above with respect to FIGS. 6 and 7. As shown in FIG. 5, configuration module 320 of design apparatus 210 can exchange configuration input/output 322 with, for instance, input/output module 300 described above in connection with FIG. 3. Configuration input/output 322, in one aspect, can include the input related to configuration as described above with reference to FIG. 6.

Configuration module 320, as shown in FIG. 8, can include a configuration engine 800 configured to interface with application configuration store 346 to store new and modified configurations 802 and to retrieve existing configuration(s) 804. New and modified configurations 802 can include configuration settings established by configuration engine 800 based on configuration input/output 322. Further, configuration engine 800 can retrieve existing configuration 804 in order to make modification thereto in accordance with configuration input/output 322. As previously described, in an exemplary, non-limiting embodiment, inheritance module 327 can be utilized to identify which parameters/settings/data are being modified between a first configuration instance and a second configuration instance. As a property is changed, inheritance module 327 can identify a property being altered from a common value and store the common value and the changed value. Hence, continuing the example with regard to 10 controllers having 10 property settings where 8 property settings are common across all 10 controller configurations and 2 properties are unique to each configuration instance. In one aspect, a configuration is edited, e.g., one of the unique properties for a configuration is changed, the changed value can be stored. In another aspect, a situation may occur where a unique setting is applied to a property that was previously determined (e.g., by inheritance module 327) to be common. All instances of the property setting across each of the 10 configurations can now be flagged by the inheritance module 327 to be unique. Accordingly, rather than the previous 28 parameters (8 common+20 unique) being stored in (e.g., in data storage 340, application configuration store 346, etc.), owing to a property no longer being common across all the configurations, now 37 property settings are stored. As further shown in FIG. 8, configuration 320 can obtain application project 806 from application project store 344 to facilitate association between generated configurations and application projects. For instance, new and modified configurations 802 can be stored in application configuration store 346 in associated with application project 806.

Configuration module 320 can include an autonomous configuration module 820 configured to generate configurations based on environment and device information associated with a target. Particularly, autonomous configuration module 810 can obtain target information 808 from target information store 348, wherein target information 808 is associated with a deployment target, such as target device 840. In autonomous configuration module 810, a target analysis module 812 is provided to evaluate aspects (e.g., hardware) associated with the deployment target based on target information 808. A network analysis module 814 is provided which is configured to identify network characteristics (e.g., locations, addresses, network topologies, etc.) associated with the deployment target and devices with which the deployment target communicates. Further, a security analysis module 816 is provided to determine, from target information 808, security polices associated with the deployment target or devices to which the deployment target communicates. Moreover, autonomous configuration module 810 includes an application analysis module 818 configured to evaluate requirements of an application associated with application project 806. For instance, application analysis module 818 can, based on application project 806, identify characteristics of an environment for which an application specified in application project 806 is expected to reside. Finally, autonomous configuration module 810 includes a configuration generation module 820 configured to generate configuration information, which can be stored in application configuration store 346. In an example, configuration generation module 820 can utilize analysis results from target analysis module 812, network analysis module 814, security analysis module 816, and application analysis module 818 to generate the configuration information.

In another aspect, design apparatus 210 can include an environment evaluation module 830, as shown in FIG. 8, which is configured to compile environmental and device information 834 into target information retained by target information store 348. In an example, environment evaluation module 830 can receive environment input 832, which can include network topologies, system designs, machine deployments, automation system deployment information, and the like. In addition, environment evaluation module 830 can communicate with a target device 840. For instance, environment evaluation module 830 can send a device query 842 and obtain device information 844 from target device 840.

Figure 9:
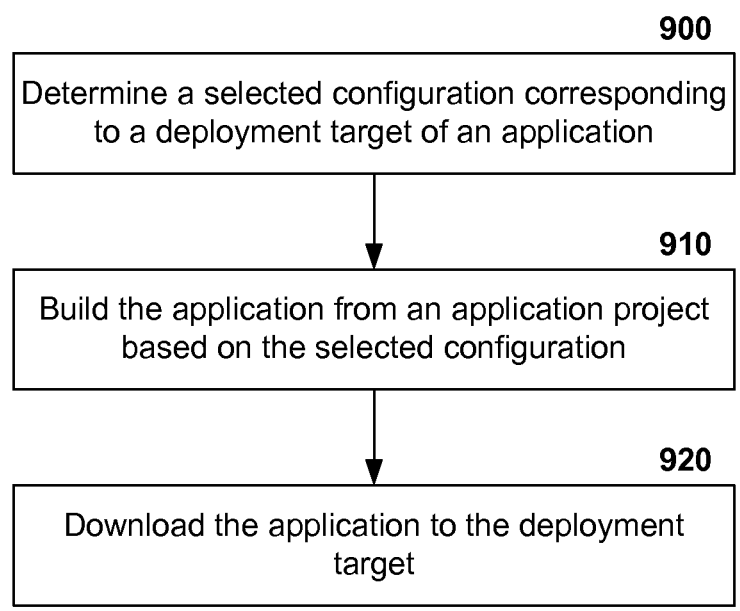
FIG. 9 illustrates a flow diagram of an exemplary, non-limiting embodiment for deploying an application to a target in accordance with a configuration.

FIG. 9 illustrates a flow diagram of an exemplary, non-limiting embodiment for deploying an application to a target in accordance with a configuration. At 900, a selected configuration, corresponding to a deployment target of an application, is determined. At 910, the application is built from an application project based on the selected configuration. For example, the application, when built, can include settings (e.g., network settings, connection settings, security settings, linker settings, etc.) established in accordance with the selected configuration. At 920, the application can be downloaded to the deployment target.

Figure 10:
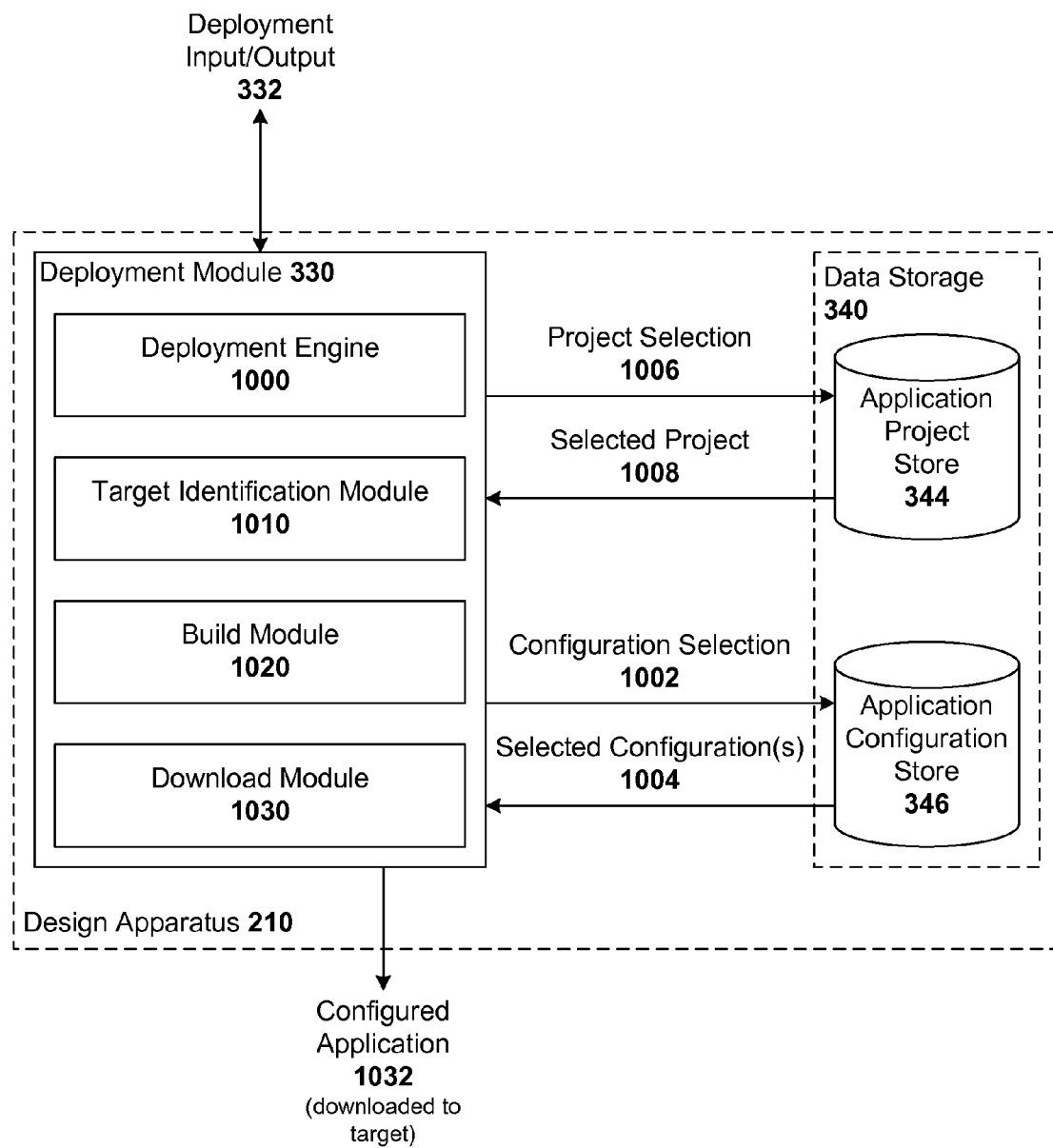
FIG. 10 illustrates a block diagram of an exemplary, non-limiting design apparatus configured to download a configured application to a target.

FIG. 10 illustrates a block diagram of an exemplary, non-limiting design apparatus configured to download a configured application to a target. FIG. 10 illustrates design apparatus 210 configured to, in an example, implement the embodiment described above with respect to FIG. 10. As shown in FIG. 10, deployment module 330 of design apparatus 210 can exchange deployment input/output 322 with, for instance, input/output module 300 described above in connection with FIG. 3.

Deployment input/output 332 can include, according to an example, can include selections of an application project to be deployed and/or selection of a configuration (or a target) for an application. Deployment module 330 includes a deployment engine 1000 configured to control a deployment process and to interface with data storage 340. Moreover, deployment engine 1000 can process input of deployment input/output 332 and generate output of deployment input/output 332. Based on deployment input/output 332, deployment engine 1000 can issue project selection 1002 to application project store 344 and obtain selected project 1008. In an example, selected project 1008 can be an application project associated with an application to be deployed to a target device. In addition, deployment engine 1000, based on deployment input/output 332, can issue a configuration selection 1002 to application configuration store 346 and obtain selection configuration(s) 1004. In an example, selected configuration(s) 1004 can include configuration settings for one or more target devices to which the application derived from selected project 1008 is deployed.

According to another example, configuration selection 1002 can be generated by a target identification module 1010 of deployment module 330, which is configured to determine a target device based on, for instance, deployment input from input/output module 300. For instance, target identification module 1010 can identify a target label or name included in deployment input and query (e.g., send configuration selection 1002) based on the identified target label or name.

When selected project 1008 and selected configuration(s) 1004 are obtained, a build module 1020 can compile (e.g., build, construct, etc.) the application from selected project 1008 and configured settings of the application in accordance with selected configuration(s) 1004. Ultimately, as shown in FIG. 10, deployment module 330 includes a download module 1030 configured to transmit configured applications 1032 to the target device.

The aforementioned embodiments of an application design apparatus provides a general architecture and various techniques through which an application can be deployed to multiple targets (e.g., controllers, terminals, etc.) in an industrial automation efficiently without duplicative and redundant utilization of application project copies. Described below are several exemplary deployment scenarios which illustrate enhancement provided by the application design apparatus described above.

Example Deployment Scenarios

The following deployment scenarios are described in accordance with visualization applications downloaded to terminals (e.g., HMI devices) which can include touch screens embedded in industrial machines or standalone computing devices communicatively coupled to industrial machines or controllers managing the industrial machines. However, it is to be appreciated that the deployment scenarios described herein can be extended to deployments of control applications to controllers.

Figure 11:
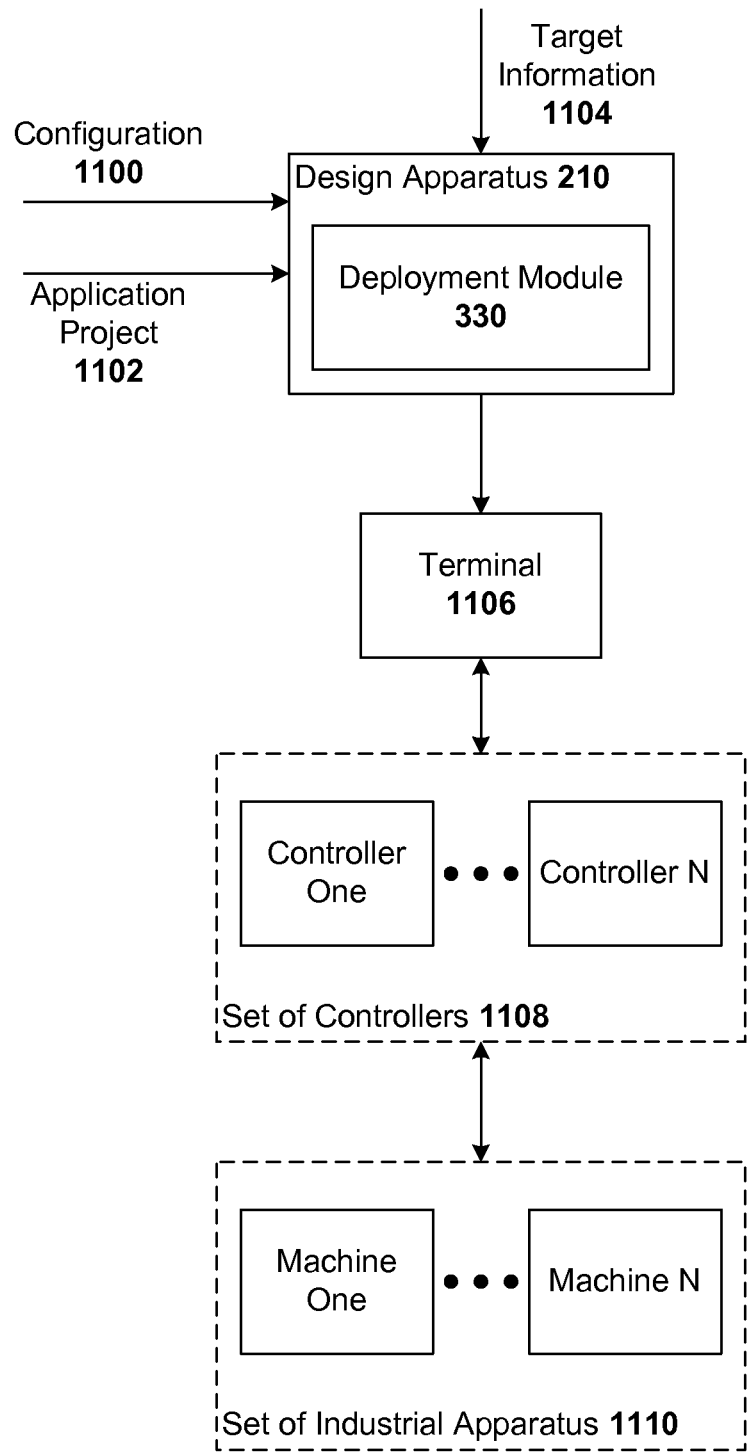
FIG. 11 is a block diagram of an exemplary, non-limiting deployment scenario in accordance with one or more aspects of the subject disclosure.

FIG. 11 depicts a block diagram of an exemplary, non-limiting deployment scenario in accordance with one or more aspects of the subject disclosure. As shown in FIG. 11, design apparatus 210 with a deployment module 330 can receive a configuration 1100, an application project 1102, and target information 1104. Deployment module 330 can build an application in accordance with these inputs. In accordance with the exemplary scenario depicted in FIG. 11, a single terminal 1106 is communicatively coupled to a set of controllers 1108 which respectively control one or more machines from a set of industrial apparatus 1110. Accordingly, target information 1104 indicates a single target, e.g., terminal 1106, and configuration 1100 includes setting associated with terminal 1106 such as connection information to enable terminal 1106 to connect to and communicate with the set of controllers 1108.

Figure 12:
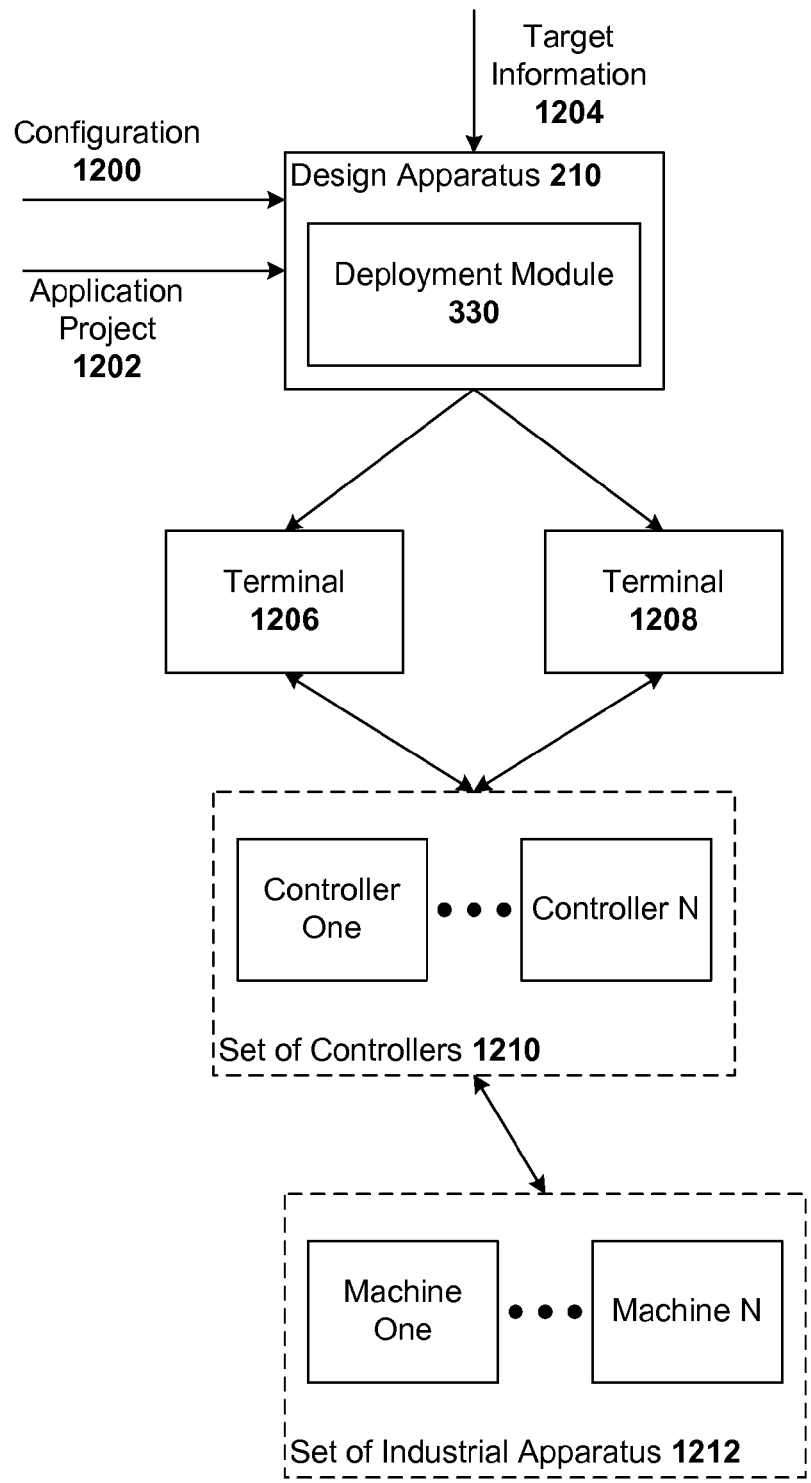
FIG. 12 is a block diagram of an exemplary, non-limiting deployment scenario in accordance with one or more aspects of the subject disclosure.

Turning to FIG. 12, illustrated is another deployment scenario which includes deployment to two or more terminals (e.g., terminal 1206 and terminal 1208), which communicate with the same set of controllers 1210 and/or the same set of industrial apparatus 1212. This scenario is suitable for environment in which a first terminal is embedded in an industrial apparatus and a second terminal, intended to provide similar functionality as the first terminal, is a general computing device located at a supervisory position within an industrial automation environment.

In accordance with this scenario, application project 1202 can be utilized by deployment module 330 to build applications for both terminal 1206 and terminal 1208, which are specified by target information 1204. However, configuration 1200 can include separate and distinct configuration settings respective associated with terminal 1206 and 1208. Accordingly, deployment module 330 builds respective applications based upon the separate configurations and downloads the respective applications to terminal 1206 and terminal 1208.

Figure 13:
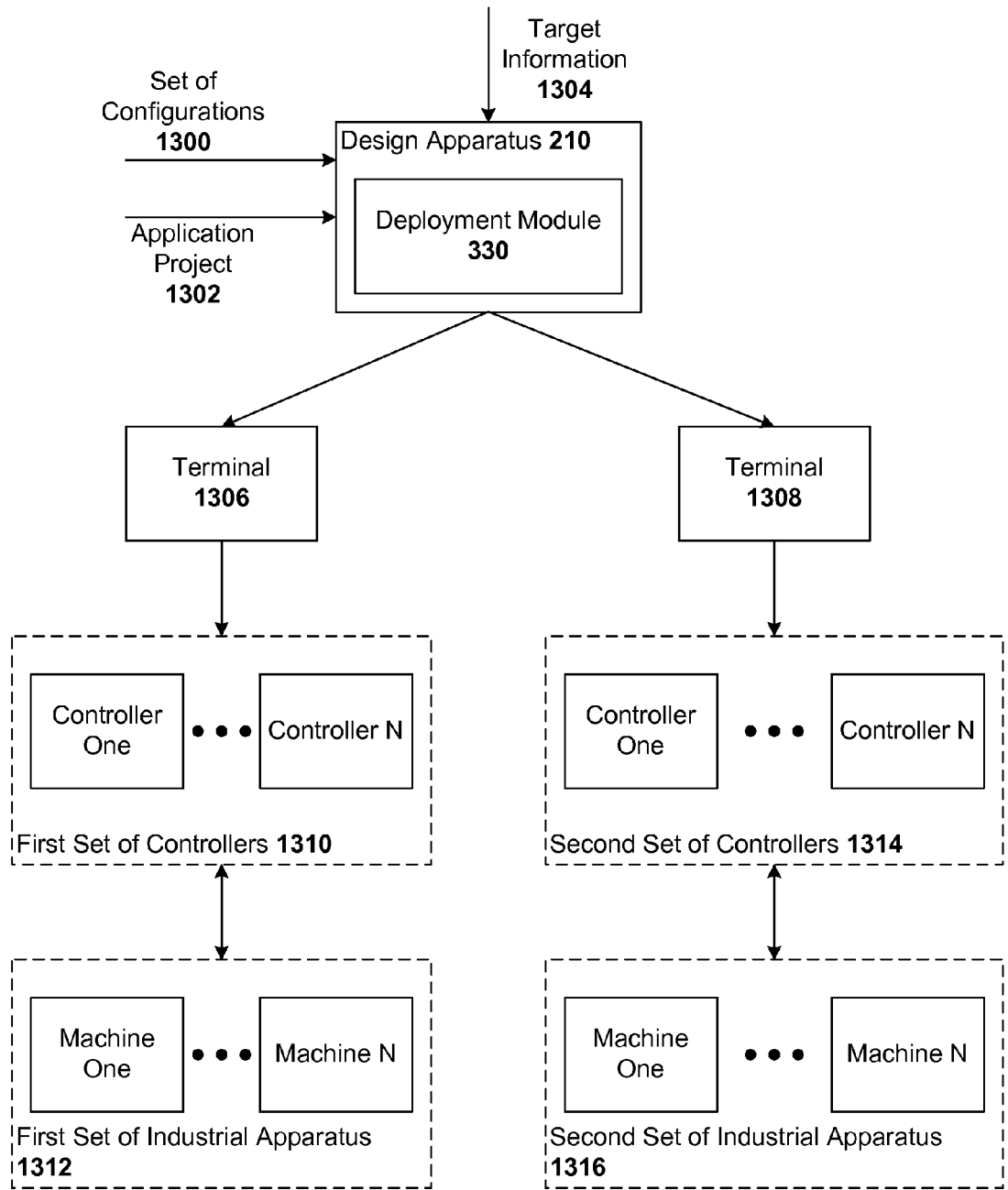
FIG. 13 is a block diagram of an exemplary, non-limiting deployment scenario in accordance with one or more aspects of the subject disclosure.

FIG. 13 illustrates a deployment scenario involving multiple terminals respectively communicating with disparate sets of controllers and/or industrial apparatus. This scenario, for instance, can be applicable to industrial automation environment including multiple redundant, but identical, production lines. As shown in FIG. 13, deployment module 330 can receive target information 1304 specifying terminal 1306 and terminal 1308. Terminal 1306 can reference a first set of controllers 1310, which respectively controls a first set of industrial apparatus 1312. Terminal 1308 can reference a second set of controllers 1314, which respectively controls a first set of industrial apparatus 1316.

Further, deployment module 330 can receive an application project 1302 and a set of configuration 1300, which includes, at least, a configuration corresponding to terminal 1306 and a configuration corresponding to terminal 1308. With the set of configuration 1300 and application 1302, deployment module 330 can compile respective applications for terminal 1306 and terminal 1308, where each application is suited for the particular communicative and hardware environment within which the respective terminal resides.

Figure 14:
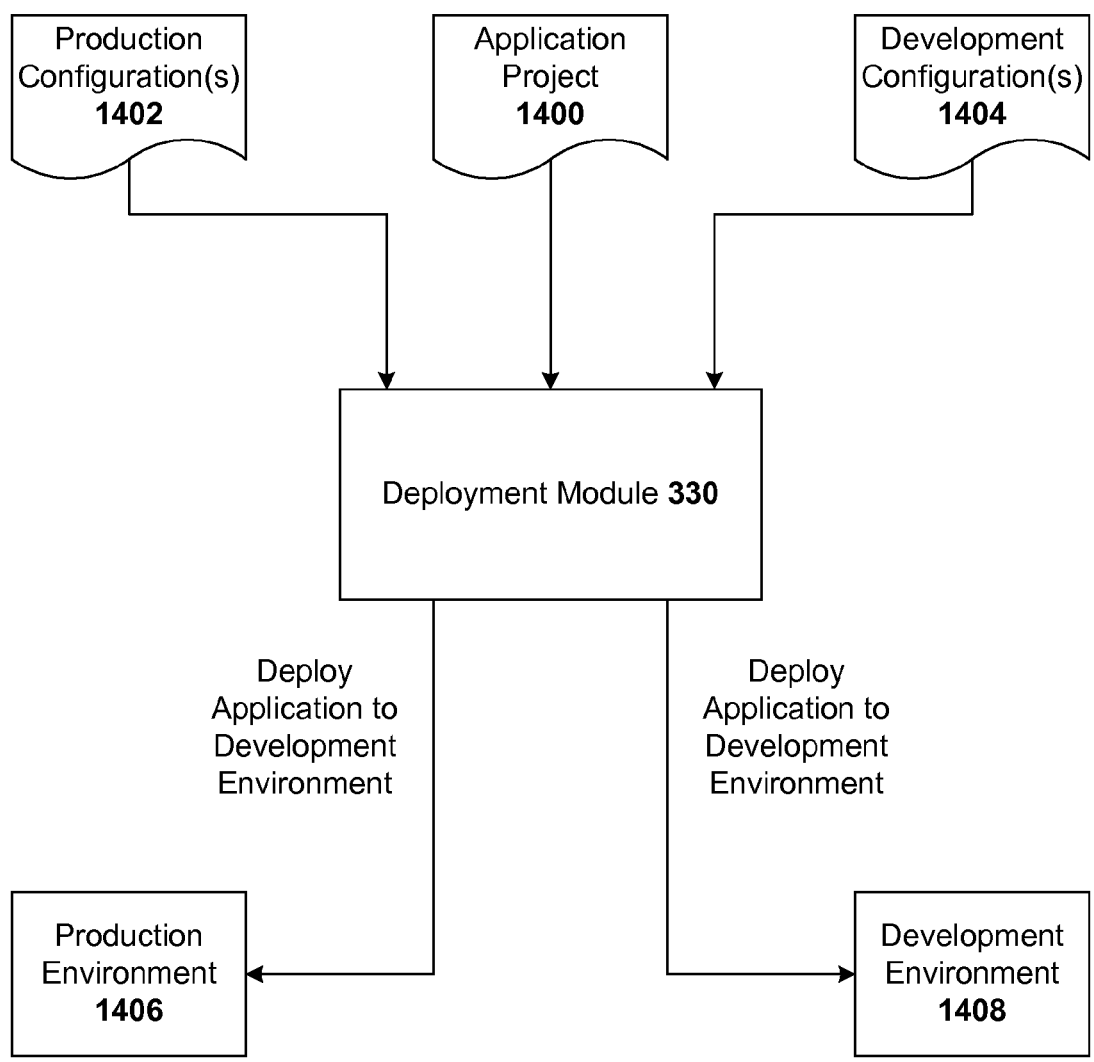
FIG. 14 is a block diagram of an exemplary, non-limiting deployment scenario in accordance with one or more aspects of the subject disclosure.

FIG. 14 illustrates a deployment scenario suitable for situations where an application project is deployed to a development system for testing, verification, and/or validation (e.g., FDA validation, etc) before deployment to a production system. As shown in FIG. 14, a deployment module 330 can receive an application project 1400, which can be built in accordance with a development configuration 1404 and downloaded (e.g., deployed) to a development environment 1408. The same application project 1400 can also be utilized by the deployment module 330 to build an application based on production configuration 1402, which is downloaded to a production environment 1406.

Figure 15:
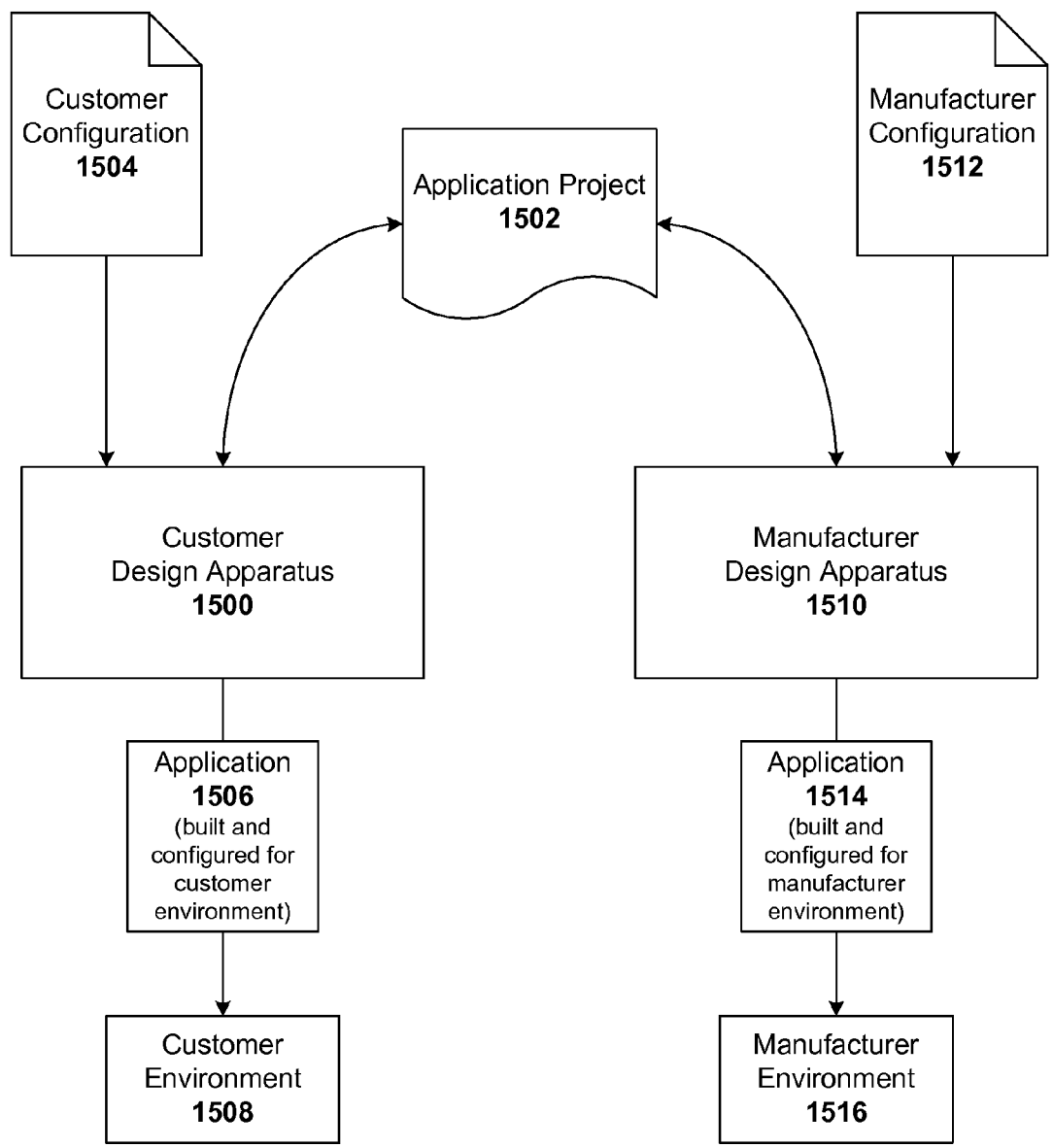
FIG. 15 is a block diagram of an exemplary, non-limiting deployment scenario in accordance with one or more aspects of the subject disclosure.

FIG. 15 depicts yet another deployment scenario for which the above described embodiments of a design apparatus can be employed. This scenario is suitable for situations in which an application project (e.g., application project 1502) is exchanged between an end user customer and an OEM for updating, debugging, etc. The manufacturer can have a different environment utilized for testing than the ultimate setup utilized by the end user customer. Accordingly, applications built from application project 1502 are configured differently. As shown in FIG. 15, an application project 1502 can be sourced by both a customer design apparatus 1500 and a manufacturer design apparatus 1510. Customer design apparatus 1500 can obtain customer configuration 1504, build application 1506, which is built and configured for customer environment 1508. Similarly, manufacturer design apparatus 1510 can obtain manufacture configuration 1512, build application 1514, which is built and configured for manufacture environment 1516. In this regard, application project 1502 can be readily exchanged between the end user customer and the OEM without manual reconfigurations occurring before the project can be utilized.

It is to be appreciated that the various configurations (e.g., terminals, controllers, etc.) with which the various embodiments presented herein can be utilized are myriad. For example, while FIGS. 11-15, present particular combinations of terminal(s), controller(s), etc., the various configurations can extend to multiple scenarios comprising single or multiple instances of terminals, controllers, etc. For example, in a non-limiting list of configurations, particular configurations can comprise of a single terminal communicatively coupled to a single controller, or multiple terminals communicatively coupled to a single controller, or a single terminal communicatively coupled to a multiple controllers, or multiple controllers communicatively coupled with multiple controllers, etc. Hence, while only a small number of example configurations are presented in FIGS. 11-15 the various embodiments presented herein can be extended as required in accordance with the number of devices (e.g., terminals, controllers, etc.) coupled communicatively.

Example User Interfaces

Figure 16:
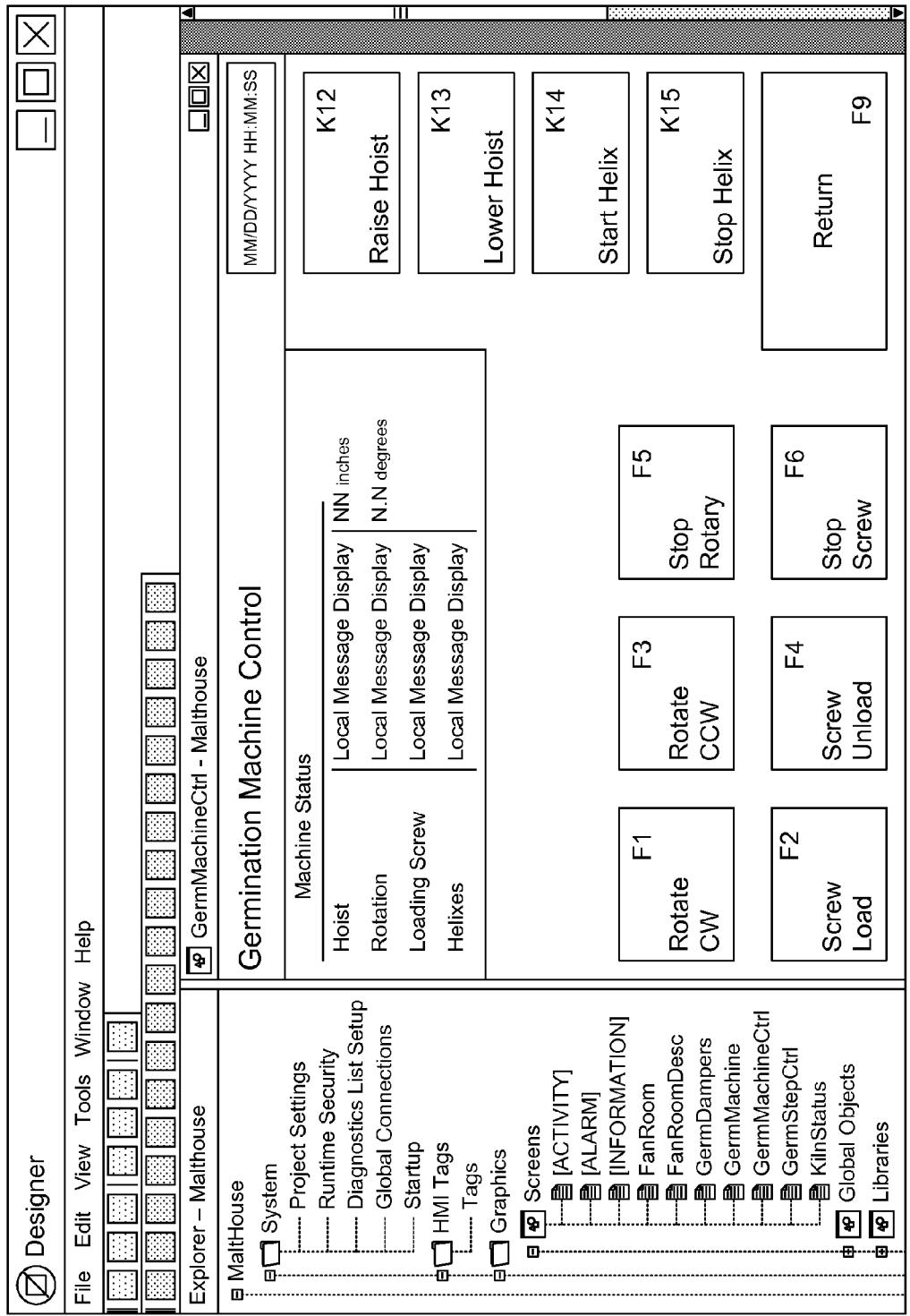

FIGS. 16-23 are exemplary, non-limiting illustrations of user interfaces of a design apparatus in accordance with one or more aspects. Turning initially to FIG. 16, illustrated is a user interface of a typical design apparatus in a development mode. As shown in FIG. 16, the design apparatus user interface can be a multi-document interface and include conventional window features such as a title bar with window controls (e.g., minimize, maximize, close), a title, and icon. In addition, the user interface can include a menu bar via which functions of the design apparatus can be accessed by a developer. In addition, the user interface can include one or more toolbars that include frequently used functions of the design apparatus and/or functions customized by a developer to be displayed on the toolbars.

In development mode, as shown in FIG. 16, an explorer sidebar can enable exploration of various aspects of an application project. For instance, via the explorer sidebar, project settings, runtime security, global settings, etc., can be accessed. In addition, the explorer sidebar can display the various screens, e.g., of a visualization application, created for the application project, to enable efficient navigation between parts of the application under development.

The user interface can also include a main window portion or editor portion which displays details of the component of the application project being developed, edited, or created. For instance, as shown in FIG. 16, a screen of the visualization application is displayed in the main window portion.

Figure 17:
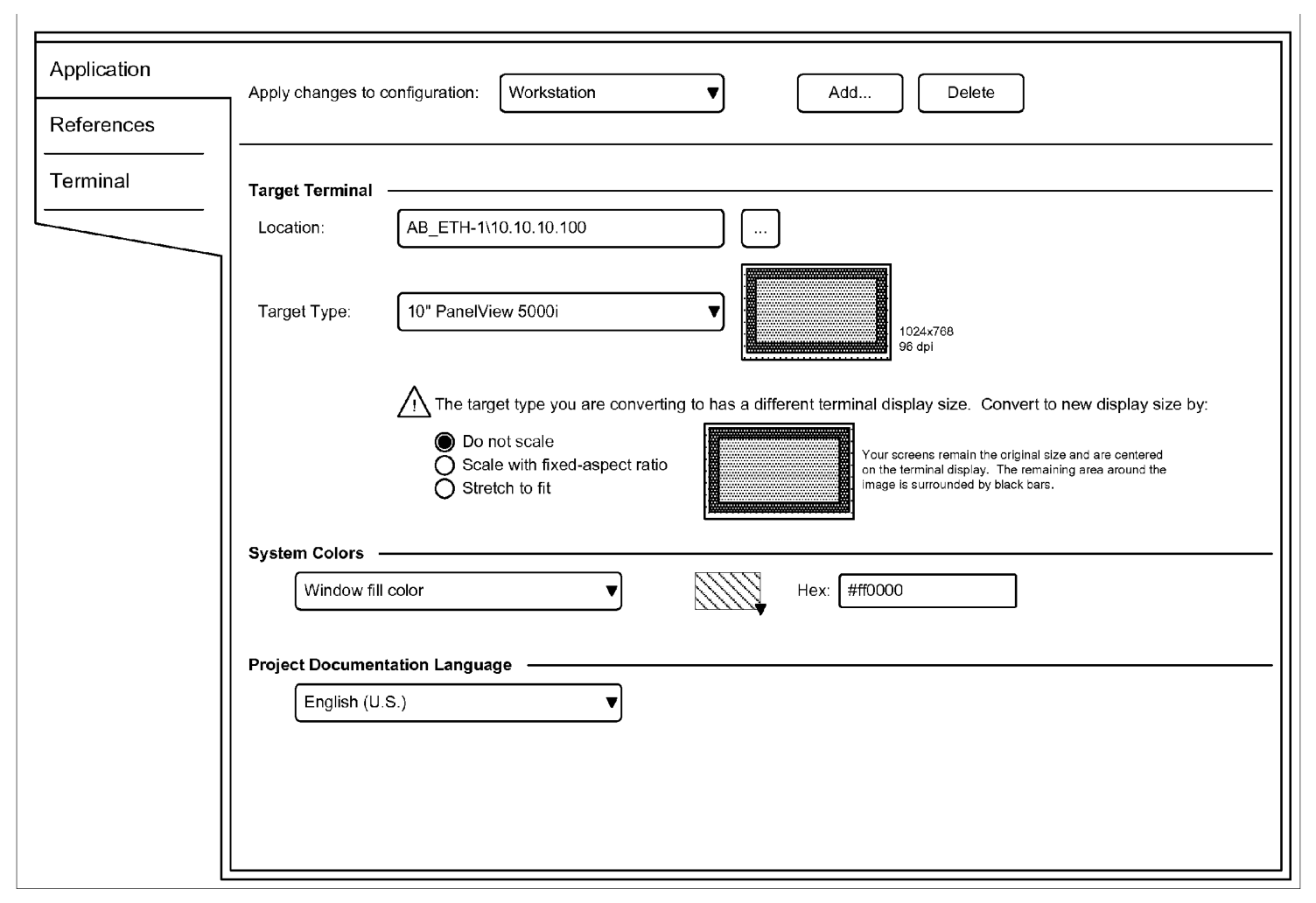

FIG. 17 depicts an exemplary user interface of a configuration wizard in accordance with one or more aspects of the subject disclosure. As shown in FIG. 17, multiple configurations can be edited or created through the user interface. For instance, at the top portion, a drop down menu enables selection of an existing configuration for editing. In addition, buttons to add a new configuration or delete a currently selected configuration are provided.

The tab of the configuration wizard shown in FIG. 17 includes application setting such as specification of a target terminal, which can be expressed by network address or other means, or browsed to and selected via built-in file exploration mechanism of an operating system supporting the design apparatus. In addition to specifying a location of the target, a target type can be selected via a drop down menu. As shown in FIG. 17, in one example, a visual depiction of the selected type can be displayed, as well as resolution characteristics of the selected type. The user interface, in an example, can display a warning when the selected target type has a display size different from an anticipated size assumed during development of the application. To address the warning, several options (e.g., do not scale, scale with a fixed-aspect ratio, stretch to fit, etc.) can be made available. In addition, the user interface enables selection of system colors (e.g., colors of different portions of the applications) and languages as shown.

Figure 18:
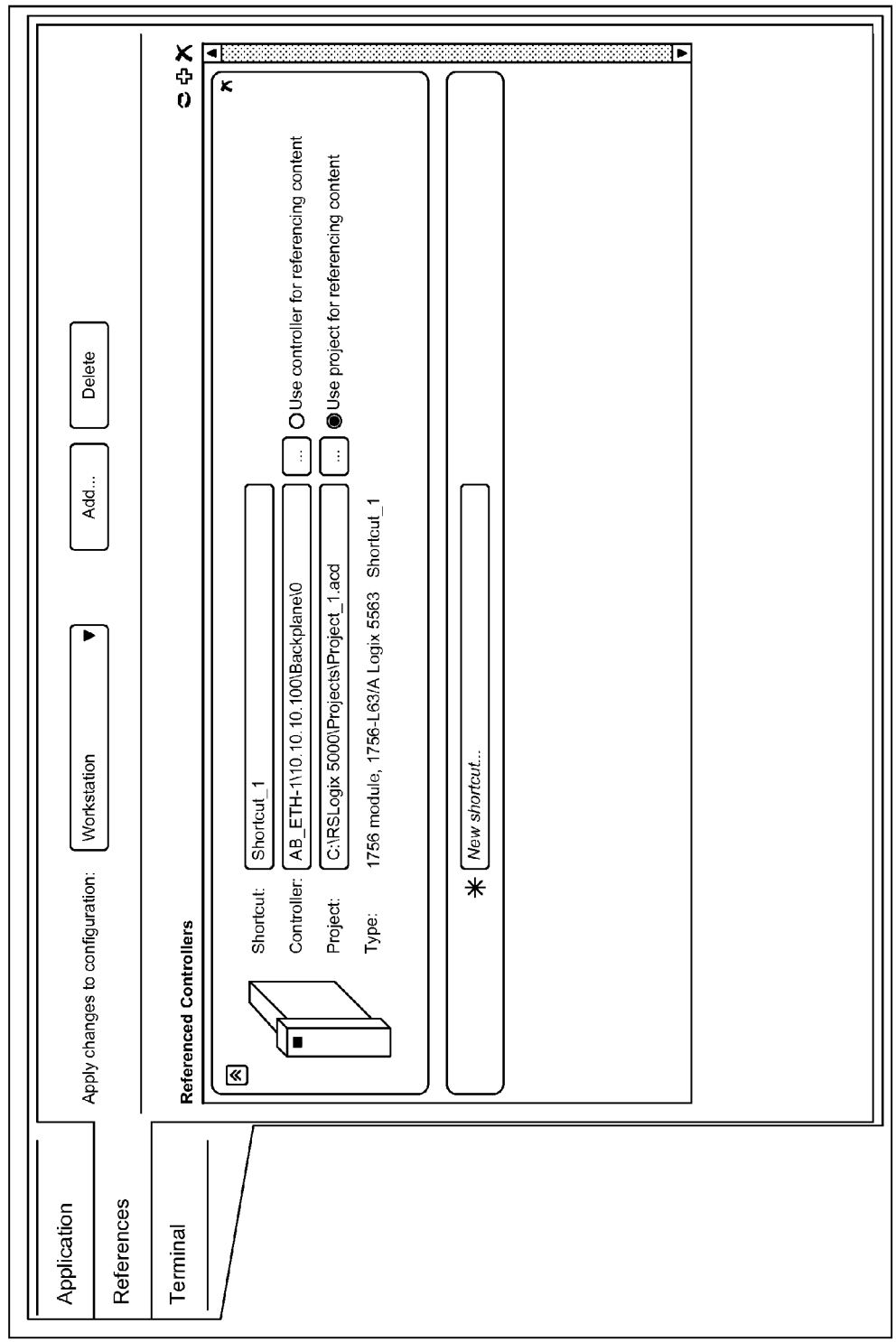

FIG. 18 illustrates a reference tab of the configuration wizard. Similar to FIG. 17, the user interface includes mechanisms to select an existing configuration to modify, to create a new configuration, or to delete a configuration. The references table enables configuration of connection or references to controllers, for example. As shown in FIG. 18, referenced controllers can be displayed in a scrollable pane. A reference controller can be depicted as a controller card that indicates a shortcut (e.g., an arbitrary name by which the controller is identified), a location of the reference controller within the industrial automation environment, a location of a project file associated with a control application on the reference controller, and some details regarding the controller.

Figure 19:
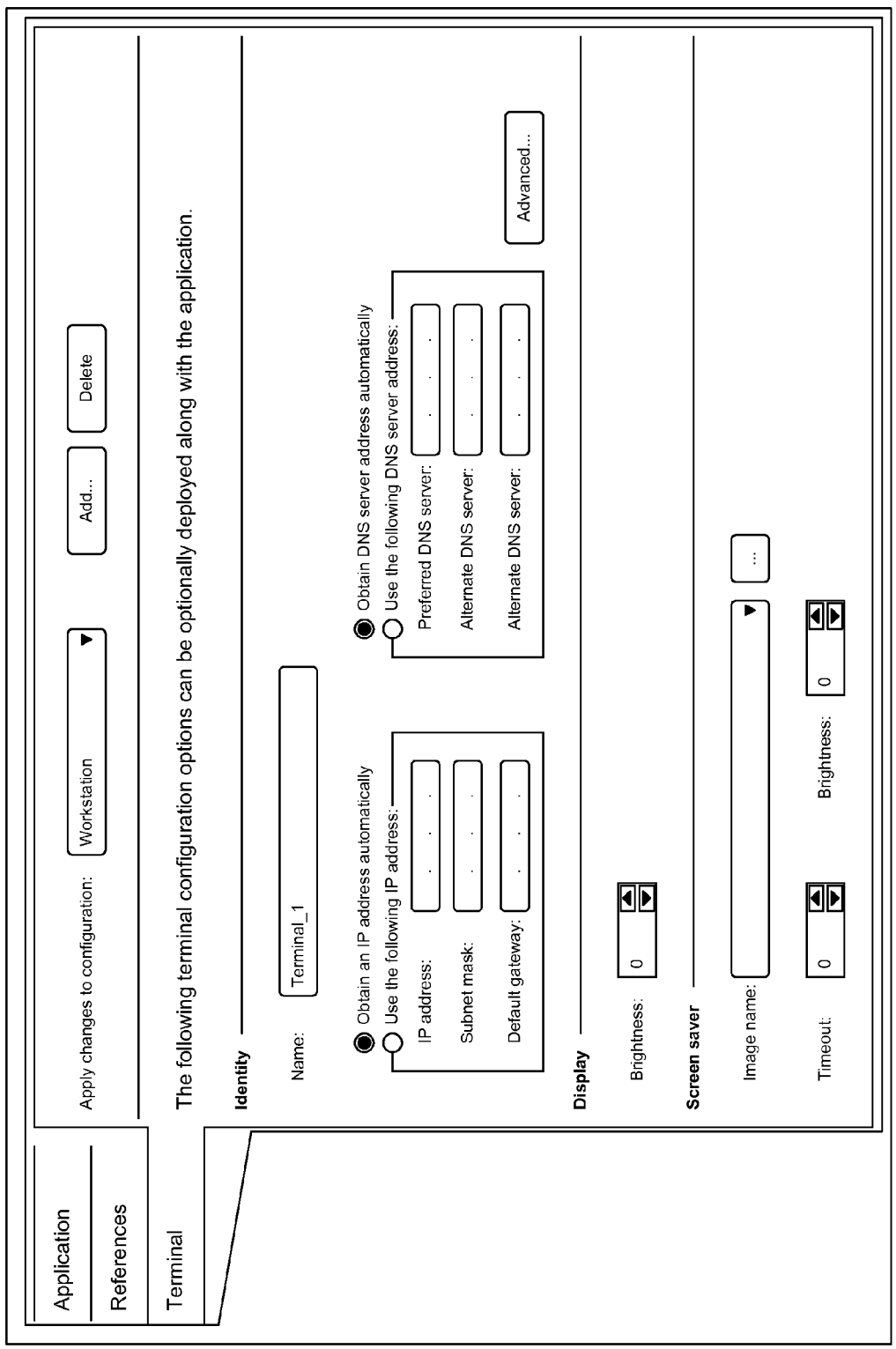
Figure 20:
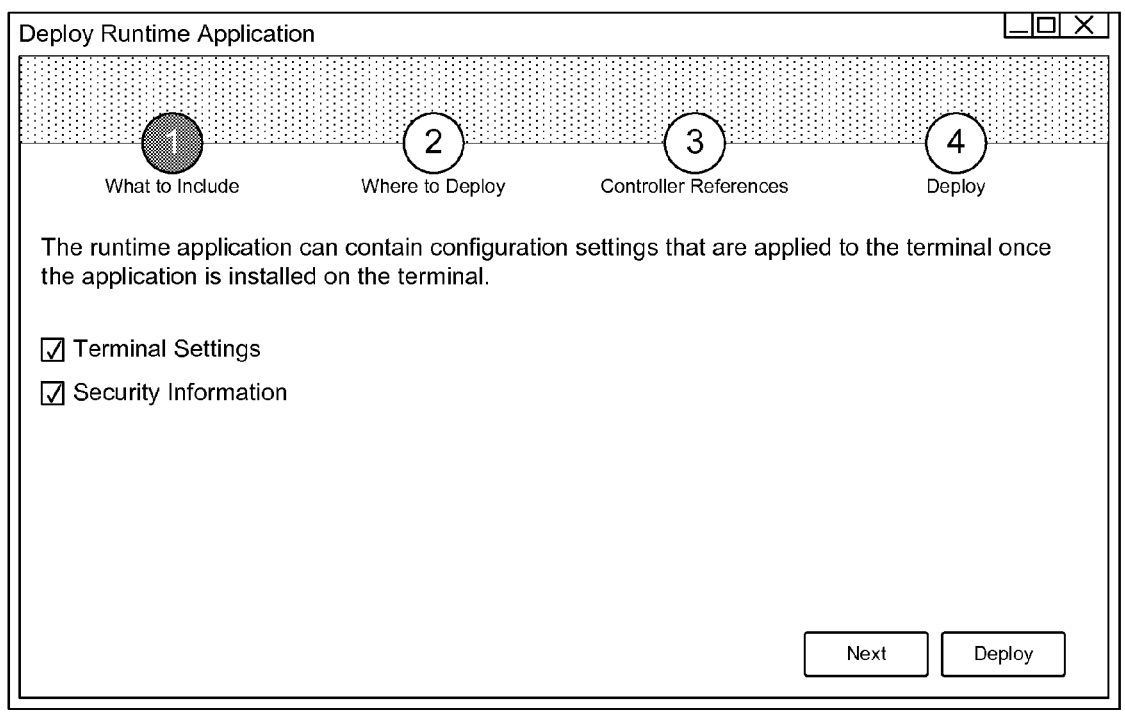

FIG. 19 illustrates a terminal tab of the configuration wizard. The terminal tab includes configuration settings for the terminal itself. For example, as shown in FIG. 19, such configuration settings can include network settings (e.g., IP addresses, gateway information, etc.), display settings (e.g., brightness, contrast, . . . ), screen saver configuration, and the like.

Figure 21:
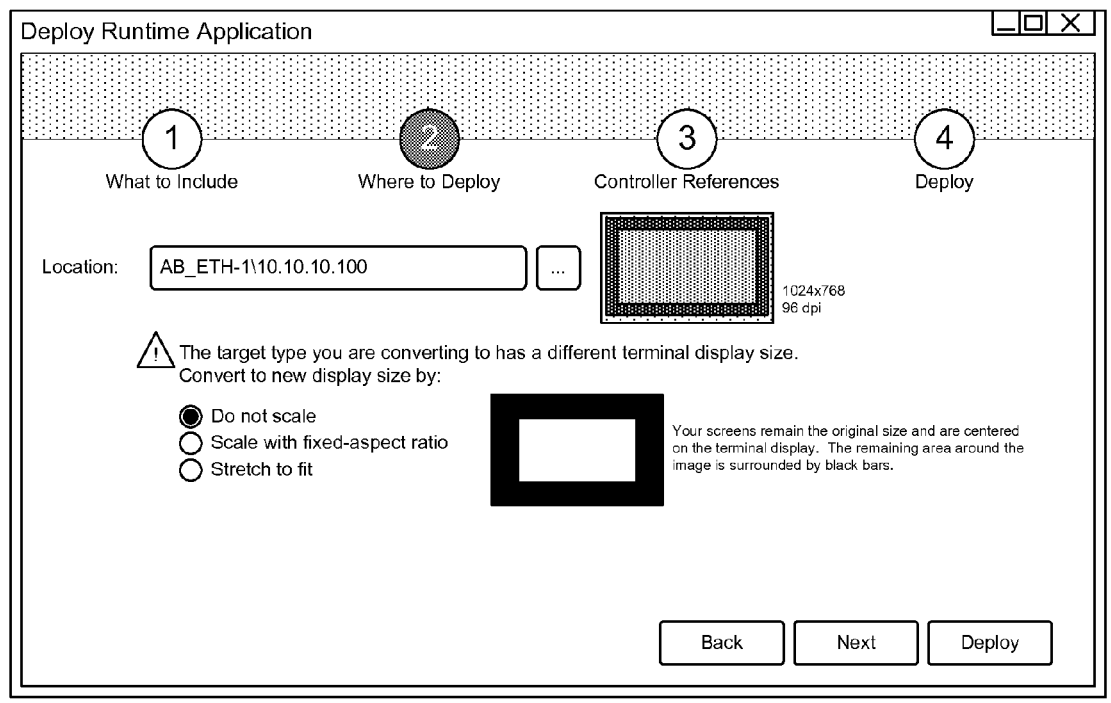
Figure 22:
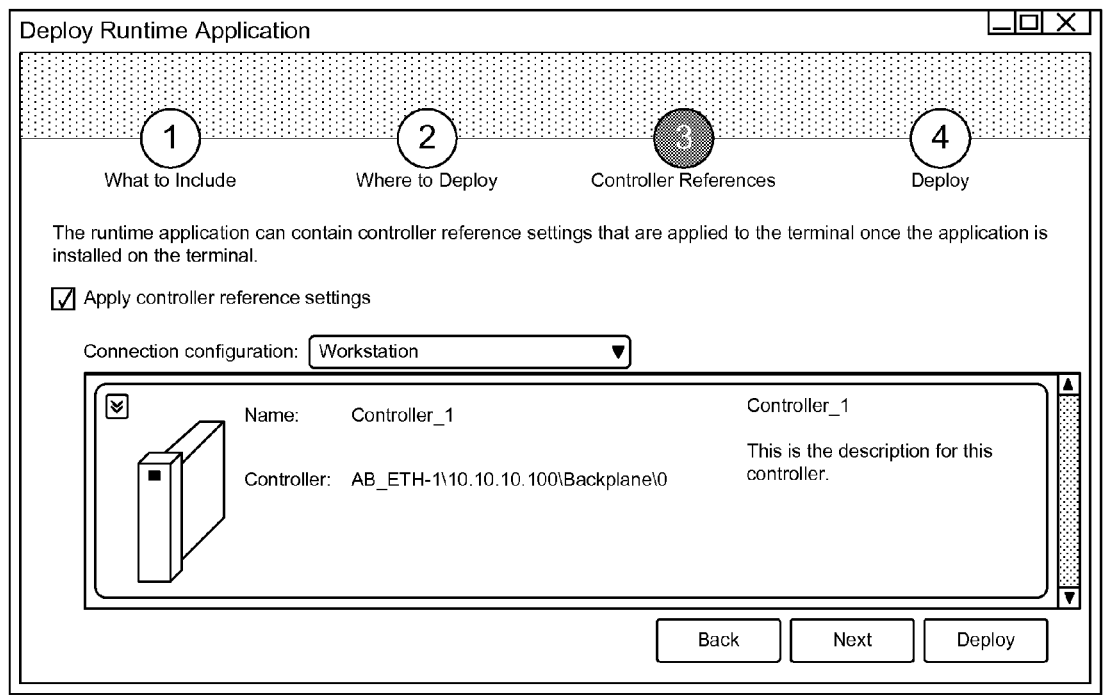
Figure 23:
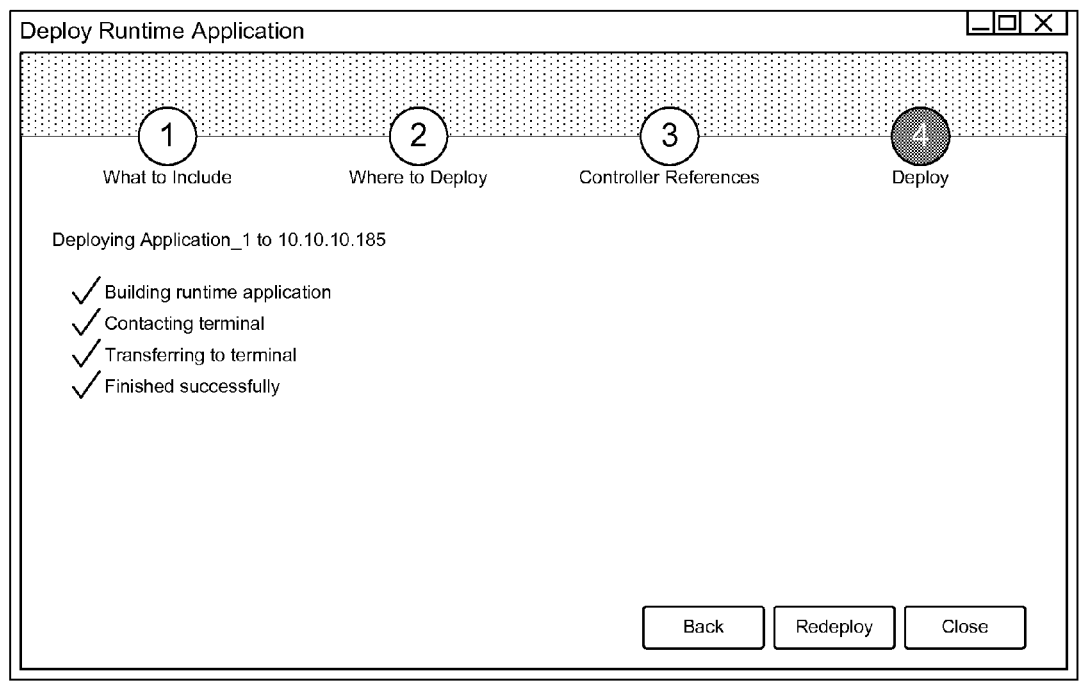

Turning to FIGS. 20-23, an exemplary, multi-step deployment wizard of the design apparatus is illustrated. Starting with FIG. 20, which depicts a first step of the deployment wizard, the user interface includes selectable options as to which portions of a configuration to include and deploy with an application. FIG. 21 illustrates a second step of deployment which includes target identification. FIG. 22 illustrates selection of a connection configuration (e.g., a set of controllers to be referenced by the deployed application). Finally, FIG. 23 illustrates execution and completion of deployment of the application to the target.

The user interface illustrated in FIGS. 16 to 23 are provided to highlight and describe embodiment and features of the design apparatus described herein and are not intended to limit the appended claims to the depictions illustrated therein. It is to be appreciated that alternative user interface can be devised to accomplish the functionality described herein and that such alternative user interface are intended to be within the scope of the appended claims.

Figure 24:
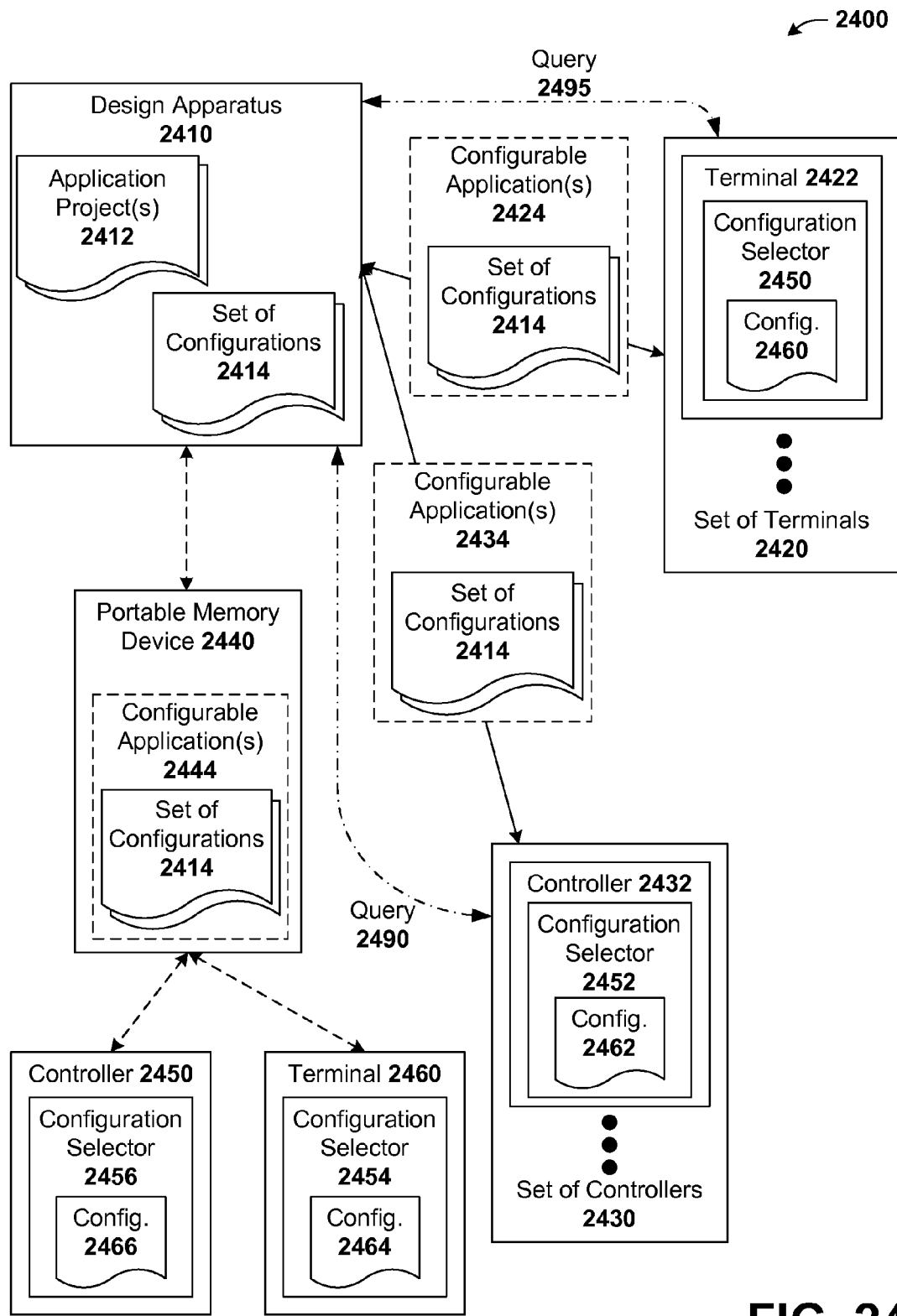
FIG. 24 is a block diagram of an exemplary, non-limiting embodiment for deploying configuration(s) in accordance with one or more aspects.

While the previously described embodiments (e.g., FIGS. 1-15) relate to an application project (e.g., application project 212) being deployed to a particular device (e.g., terminal 222, set of terminals 220, controller 232, set of controllers 230, controller 250, or terminal 260), wherein the application project 212 comprises a particular configuration (e.g., any of the configurations comprising set of configurations 214) it is also possible to provide a plurality of configurations to a particular device from which selection of the required configuration is performed at the device. FIG. 24, illustrates an exemplary, non-limiting embodiment of receiving at a device a plurality of configurations from which a required configuration is selected. In previous non-limiting, exemplary embodiments, a user can configure, via a design apparatus (e.g., design apparatus 210), which application project (e.g., application project 212) to provide to a particular device and a configuration (e.g., any of configurations 214) to be associated therewith. As shown in FIG. 24, a set of configurations (e.g., set of configurations 2414) are provided with an application (e.g., configurable application 2424) for download to a device (e.g., terminal 2422), whereupon receipt of the set of the configurations, selection of which configuration to utilize is performed at the device, either automatically or manually.

For example, a configurable application 2424 can be forwarded from the design apparatus 2410 to terminal 2422, wherein terminal 2422 can be in a set of available terminals 2420. Configurable application 2424 is accompanied by a set of configurations 2414, where the configurable application 2424 is constructed such that it can be in a final configured state based upon any of the configurations in the set of configurations 2414. Upon receipt at terminal 2422, configuration selector 2450 selects from the set of configurations 2414 a configuration 2460 to utilize on terminal 2422, and effectively configure application 2424 therewith.

Selection of which configuration to utilize, e.g., configuration 2460 can be based upon any suitable criteria available to associate terminal 2422 with configuration 2460. Such criteria can be an IP address contained in configuration 2460 that corresponds with an IP address of terminal 2422. In another aspect, the criteria can be based upon a unified plant model (UPM) which is utilized to identify plant equipment, where such unified plant models include ANSI/ISA-88, ANSI/ISA-95, and similar standards, wherein terminal 2422 can be associated with configuration 2460 based on the location of terminal 2422 with respect to a manufacturing process line, factory, etc. In another aspect, configuration selector 2450 can present the available set of configurations 2414 to an operator who at a particular moment (e.g., initial startup of terminal 2422) selects from the presented set of configurations 2414 a configuration to utilize on terminal 2422.

Similar functionality can be utilized by controller 2432, where controller 2432 can reside in a set of controllers 2430. A configurable application 2434 (which can be the same as configured application 2424) is provided from design apparatus 2410 to controller 2432, wherein configurable application 2434 is accompanied by a set of configurations 2414. A configuration selector 2452 at controller 2432 can be utilized to select from the set of configurations 2414, configuration 2462 to be employed with configurable application 2434 on controller 2432. As described above, selection of configuration 2462 can be based on any suitable criteria such as matching of IP address between the configuration 2462 and controller 2432, association based on a UPM or similar standard, or presenting the set of configuration 2414 to a user for a user to select configuration 2462 therefrom.

Also, as shown in FIG. 24, a set of configurations 2414 can be stored on portable memory device 2440 along with one or more configurable application(s) 2444. Upon connection with controller 2450, configuration selector 2456 can be utilized (in a similar manner to configuration selectors 2450 or 2452) to select configuration 2466 to be utilized with application 2444. A similar approach can be employed to provide a set of configurations 2414 to terminal 2460, whereupon configuration selector 2454 selects configuration 2464 to be utilized on terminal 2460. Selection of configuration 2464 by configuration selector 2454 in a manner similar to that utilized by any of configuration selectors 2450, 2452, or 2456, e.g., selection can be automatic based upon an association between terminal 2460 and configuration 2464 (e.g., matching IP address), or by manual means such as presenting with the configuration selector 2454 the set of configurations 2414 from which an operator of terminal 2460 can select.

Further illustrated in FIG. 24 is a mechanism of querying, by design apparatus 2410, any of respective devices (e.g., set of terminals 2420, terminal 2422, set of controllers 2430 or controller 2432). By performing a query operation, design apparatus 2410 can obtain from the respective device, information pertaining to the device such as an IP address, UPM identifier(s), etc. which can be utilized by the design apparatus 2410 to uniquely identify a configuration (e.g., in the set of configurations 2414) to be associated with the respective device. By performing such a query operation, it is possible to automatically associated a configuration with a device, and thereby minimize errors (e.g., wrong configuration being employed) associated with deploying a configuration to a particular device.

It is to be appreciated that the various components illustrated in FIG. 24 can function in a manner similar to previously presented components. For example design apparatus 2410 can include functionality of design apparatus 210, terminal 2422 can include functionality of terminal 222, controller 2432 can include functionality of controller 232, portable memory device 2440 can include functionality of portable memory device 240, configurations 2414 can include functionality of configurations 214, application projects 2412 can include functionality of application projects 212, configured applications 2444, 2434, 2424 with respective configured application 224, 234, 244, etc.

Figure 25:
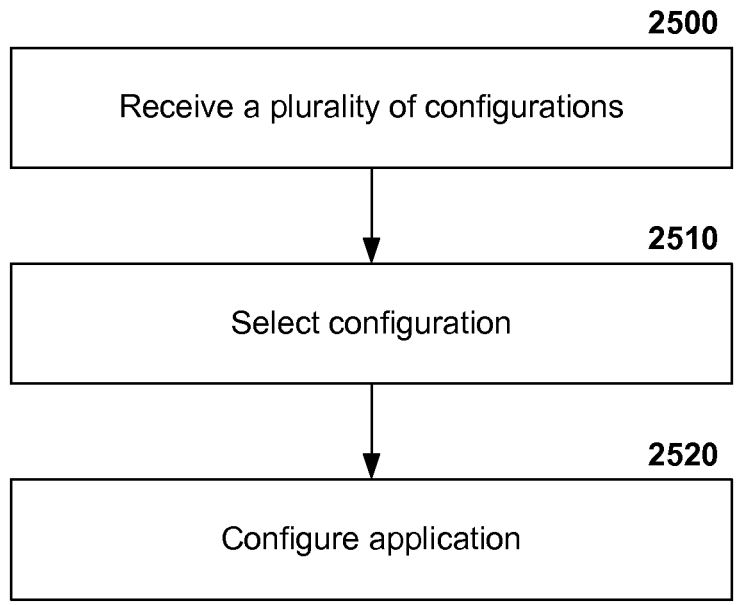
FIG. 25 illustrates a flow diagram of an exemplary, non-limiting embodiment for deploying a configuration to a target in accordance with a configuration in accordance with one or more aspects.

FIG. 25 illustrates a flow diagram of an exemplary, non-limiting embodiment for selecting a configuration with which to configure an application. At 2500, a plurality of configurations (e.g., set of configurations 2414) are received at a device (e.g., any of terminal 2422, controller 2432, controller 2450 or terminal 2460). Each of the configurations can be utilized to configure an application to operate on the device. At 2510, a configuration, from the plurality of configurations, is selected. Selection can be automatic based upon association of matching criteria. For example, selection is based on the IP address of the device corresponding with the IP address in the configuration. In another example, selection can be based upon a variable, such as associated with a unified plant model (e.g., ANSI/ISA-88, ANSI/ISA-95, etc.) being common to the device and the configuration. In a further example, selection can be performed manually, wherein the plurality of configurations are presented to a user, from which the user selects the required configuration. At 2520 the configuration is applied to configure the application to be executed on the device.

Figure 26:
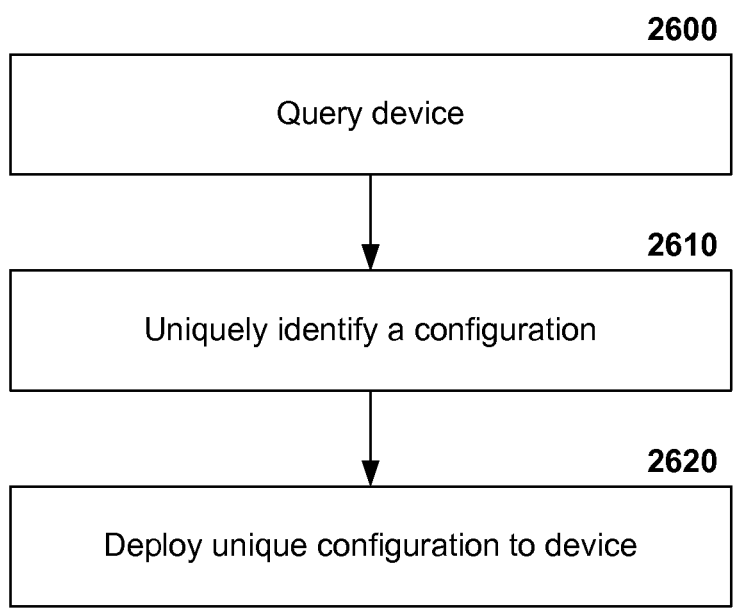
FIG. 26 illustrates a flow diagram of an exemplary, non-limiting embodiment for querying a device in accordance with one or more aspects.

FIG. 26 illustrates a flow diagram of an exemplary, non-limiting embodiment for querying a device to facilitate association with a configuration. At 2600, a device (e.g., any of any of terminal 2422, controller 2432, controller 2450 or terminal 2460) is queried (e.g., by design apparatus 2410) to determine information uniquely identifying the device. Information for uniquely identifying the device can include any suitable identifier such as IP address, UPM identifier, etc. At 2610, a particular configuration (e.g., any configuration in the set of configurations 2414) can be uniquely identified for utilization on the device. The uniquely identified configuration can be utilized to facilitate configuration of an application (e.g., any of application project(s) 2412) to be executed on the device. At 2620 the uniquely identified configuration and any associated application are deployed to the device.

Exemplary Networked and Distributed Environments

One of ordinary skill in the art can appreciate that the various embodiments of a design apparatus for industrial automation environment applications and associated methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the design apparatus as described for various embodiments of the subject disclosure.

Figure 27:
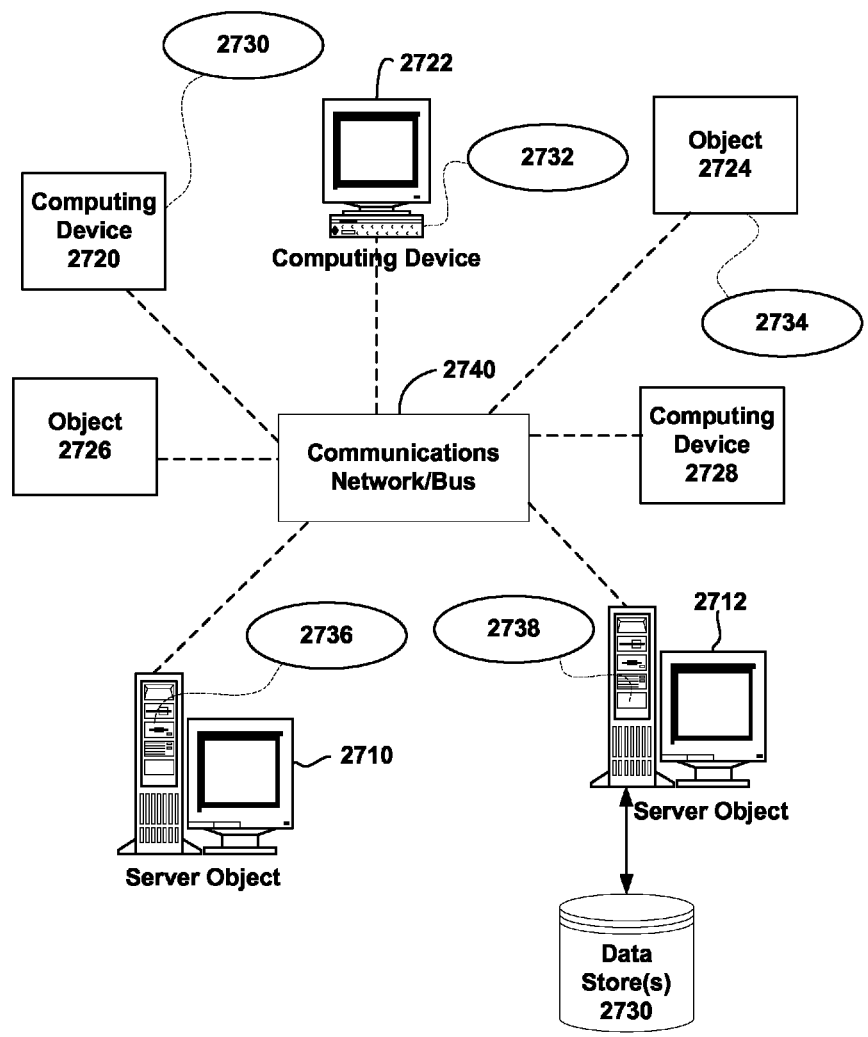
FIG. 27 is a block diagram representing exemplary non-limiting networked environments in which various embodiments described herein can be implemented.

FIG. 27 provides a schematic diagram of an exemplary networked or distributed computing environment. The distributed computing environment comprises computing objects 2710, 2712, etc. and computing objects or devices 2720, 2722, 2724, 2726, 2728, etc., which may include programs, methods, data stores, programmable logic, etc., as represented by applications 2730, 2732, 2734, 2736, 2738. It can be appreciated that computing objects 2710, 2712, etc. and computing objects or devices 2720, 2722, 2724, 2726, 2728, etc. may comprise different devices, such as personal digital assistants (PDAs), audio/video devices, mobile phones, MP3 players, personal computers, laptops, etc.

Each computing object 2710, 2712, etc. and computing objects or devices 2720, 2722, 2724, 2726, 2728, etc. can communicate with one or more other computing objects 2710, 2712, etc. and computing objects or devices 2720, 2722, 2724, 2726, 2728, etc. by way of the communications network 2740, either directly or indirectly. Even though illustrated as a single element in FIG. 27, communications network 2740 may comprise other computing objects and computing devices that provide services to the system of FIG. 27, and/or may represent multiple interconnected networks, which are not shown. Each computing object 2710, 2712, etc. or computing object or device 2720, 2722, 2724, 2726, 2728, etc. can also contain an application, such as applications 2730, 2732, 2734, 2736, 2738, that might make use of an API, or other object, software, firmware and/or hardware, suitable for communication with or implementation of the design apparatus and associated mechanisms in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 27, as a non-limiting example, computing objects or devices 2720, 2722, 2724, 2726, 2728, etc. can be thought of as clients and computing objects 2710, 2712, etc. can be thought of as servers where computing objects 2710, 2712, etc., acting as servers provide data services, such as receiving data from client computing objects or devices 2720, 2722, 2724, 2726, 2728, etc., storing of data, processing of data, transmitting data to client computing objects or devices 2720, 2722, 2724, 2726, 2728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 2740 or bus is the Internet, for example, the computing objects 2710, 2712, etc. can be Web servers with which other computing objects or devices 2720, 2722, 2724, 2726, 2728, etc. communicate via any of a number of known protocols, such as the hypertext transfer protocol (HTTP). Computing objects 2710, 2712, etc. acting as servers may also serve as clients, e.g., computing objects or devices 2720, 2722, 2724, 2726, 2728, etc., as may be characteristic of a distributed computing environment.

Exemplary Computing Device

As mentioned, advantageously, the techniques described herein can be applied to any device where it is desirable to deploy an application, according to a plurality of configurations, to a plurality of devices in an industrial automation environment. It can be understood, therefore, that handheld, portable and other computing devices and computing objects of all kinds are contemplated for use in connection with the various embodiments, i.e., anywhere that where users can access, utilize, or deploy industrial applications. Accordingly, the below general purpose remote computer described below in FIG. 28 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 28:
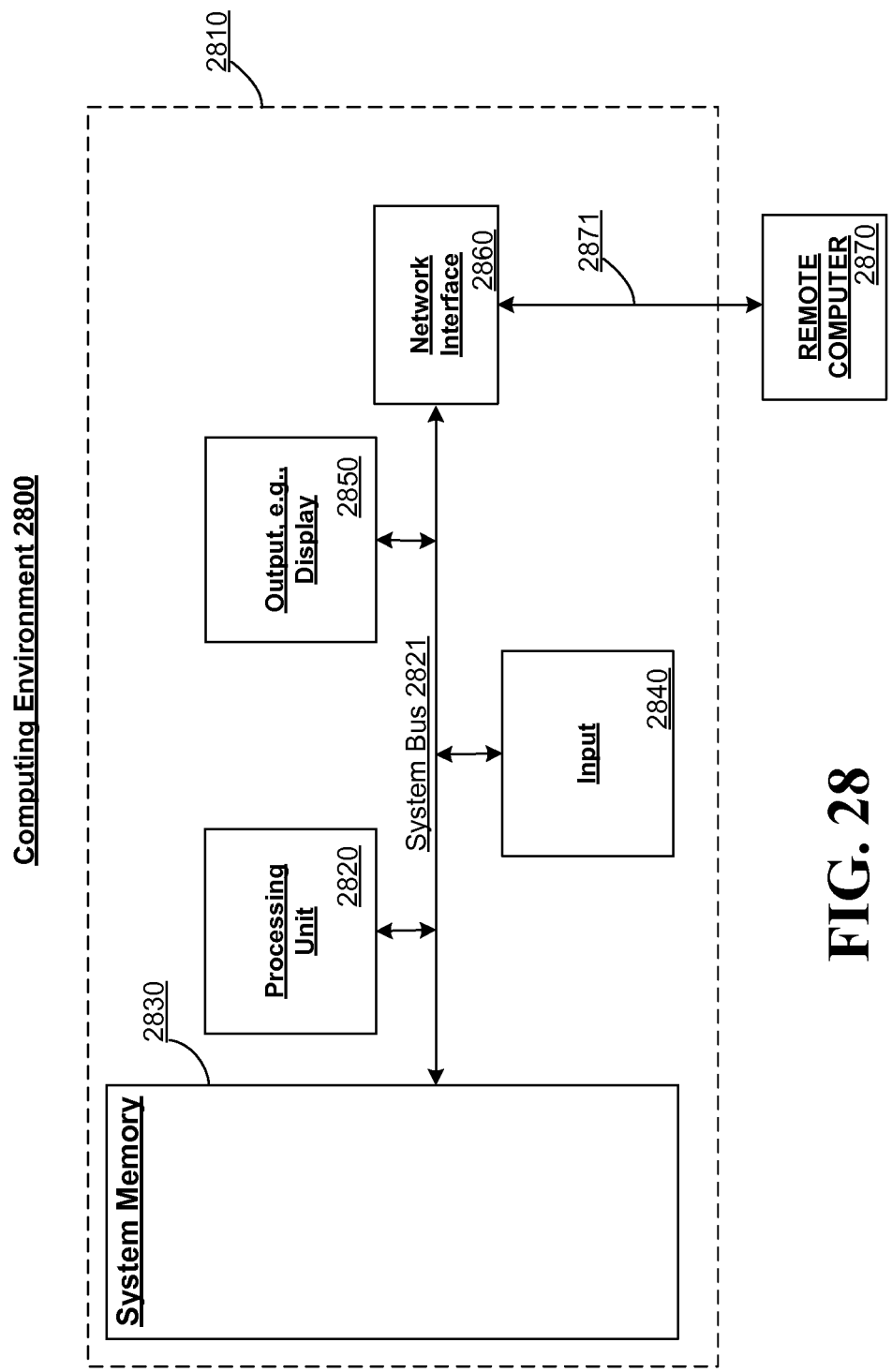
FIG. 28 is a block diagram representing an exemplary non-limiting computing system or operating environment in which one or more aspects of various embodiments described herein can be implemented.

FIG. 28 thus illustrates an example of a suitable computing system environment 2800 in which one or aspects of the embodiments described herein can be implemented, although as made clear above, the computing system environment 2800 is only one example of a suitable computing environment and is not intended to suggest any limitation as to scope of use or functionality. In addition, the computing system environment 2800 is not intended to be interpreted as having any dependency relating to any one or combination of components illustrated in the exemplary computing system environment 2800.

With reference to FIG. 28, an exemplary remote device for implementing one or more embodiments includes a general purpose computing device in the form of a computer 2810. Components of computer 2810 may include, but are not limited to, a processing unit 2820, a system memory 2830, and a system bus 2822 that couples various system components including the system memory to the processing unit 2820.

Computer 2810 typically includes a variety of computer readable media and can be any available media that can be accessed by computer 2810. The system memory 2830 may include computer storage media in the form of volatile and/or nonvolatile memory such as read only memory (ROM) and/or random access memory (RAM). By way of example, and not limitation, system memory 2830 may also include an operating system, application programs, other program modules, and program data. According to a further example, computer 2610 can also include a variety of other media (not shown), which can include, without limitation, RAM, ROM, EEPROM, flash memory or other memory technology, compact disk (CD) ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 2810 through input devices 2840. A monitor or other type of display device is also connected to the system bus 2822 via an interface, such as output interface 2850. In addition to a monitor, computers can also include other peripheral output devices such as speakers and a printer, which may be connected through output interface 2850.

The computer 2810 may operate in a networked or distributed environment using logical connections to one or more other remote computers, such as remote computer 2870. The remote computer 2870 may be a personal computer, a server, a router, a network PC, a peer device or other common network node, or any other remote media consumption or transmission device, and may include any or all of the elements described above relative to the computer 2810. The logical connections depicted in FIG. 28 include a network 2872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a game for real-world application.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art.

Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method, comprising:
identifying, by a system including a processor, a plurality of devices to which to install an application;
analyzing, by the system, the devices to determine respective characteristics of the devices;
analyzing, by the system, respective environments in which the devices are located and generating respective environmental information for the devices for use in producing respective specialized applications from the application for the devices, wherein the environmental information for a device comprises at least one of a network topology of other devices in communication with the device, installed manufacturing machines in the environment in which the device is located, or installed automation equipment in the environment in which the device is located;
generating, by the system, respective configuration information for the devices based upon the respective characteristics and the respective environmental information of the devices;
producing, by the system, the respective specialized applications from the application for the devices based upon the respective configuration information;
deploying, by the system, to a first device of the plurality of devices a first specialized application corresponding to the first device;
deploying, by the system, to a second device of the plurality of devices a second specialized application corresponding to the second device, and
wherein the first specialized application is different from the second specialized application, and the first device is associated with a first industrial process and the second device is associated with a second industrial process that is different from the first industrial process.

2. The method of claim 1, wherein a specialized application for the device comprises at least one of network settings, connection settings, security settings, or linker settings established in accordance with the set of configuration information for the device.

3. The method of claim 1, wherein the analyzing the devices comprises analyzing respective hardware of the devices.

4. The method of claim 3, wherein the respective characteristics of the devices comprise respective hardware characteristics of the devices.

5. A system, comprising:
a memory; and
a processor, coupled to the memory, configured to execute computer-executable modules stored in the memory, the computer-executable modules comprising:
an autonomous configuration module configured to:
evaluate target devices to which an application will be installed and identify respective characteristics of the target devices,
evaluate respective environments in which the target devices are located and generate respective environmental information for the target devices for use in compiling respective builds of the application for the target devices, wherein the environmental information for a target device comprises at least one of a network topology of other devices in communication with the target device, installed manufacturing machines in the environment in which the target device is located, or installed automation equipment in the environment in which the target device is located;

a configuration module configured to generate respective sets of configuration information for the target devices based upon the respective characteristics and the respective environmental information of the target devices, wherein the respective sets of configuration information for the target devices are associated with the application;

a build module configured to compile the respective builds of the application for the target devices based upon the respective sets of configuration information; and a deployment module configured to:
  install on a first target device a first compiled build of the application corresponding to the first target device, and
  install on a second target device a second compiled build of the application corresponding to the second target device, wherein the first target device is associated with a first industrial process and the second target device is associated with a second industrial process that is different from the first industrial process.

6. The system of claim 5, wherein a build of the application for the target device comprises at least one of network settings, connection settings, security settings, or linker settings established in accordance with the set of configuration information for the target device.

7. The system of claim 5, wherein the autonomous configuration module evaluates the target devices comprising evaluation of respective hardware of the target devices.

8. The system of claim 7, wherein the respective characteristics of the target devices comprise respective hardware characteristics of the target devices.

9. A non-transitory computer-readable medium having instructions stored thereon that, in response to execution, cause a system including a processor to perform operations comprising:
  evaluating target devices to which to install an application and determining respective characteristics of the target devices;
  evaluating respective environments in which the target devices are located and generating respective environmental information for the target devices for use in assembling respective specialized applications from the application for the target devices, wherein the environmental information for a target device comprises at least one of a network topology of other devices in communication with the target device, installed manufacturing machines in the environment in which the target device is located, or installed automation equipment in the environment in which the target device is located;
  producing respective configuration information for the plurality of target devices based upon the respective characteristics and the respective environmental information of the target devices;
  assembling the respective specialized applications from the application for the target devices based upon the respective configuration information, where each specialized application is different from others of the specialized applications;
  installing to a first target device a first specialized application corresponding to the first target device; and
  installing to a second target device a second specialized application corresponding to the second target device, wherein the first target device is associated with a first industrial process and the second target device is associated with a second industrial process that is different from the first industrial process.

10. The non-transitory computer-readable medium of claim 9, wherein a specialized application for the target device comprises at least one of network settings, connection settings, security settings, or linker settings established in accordance with the set of configuration information for the target device.

11. The non-transitory computer-readable medium of claim 9, wherein the evaluating the target devices comprises evaluating respective hardware of the target devices.

12. The non-transitory computer-readable medium of claim 11, wherein the respective characteristics of the target devices comprise respective hardware characteristics of the target devices.

* * * * *